(12) United States Patent
Dhanabalan et al.

(10) Patent No.: US 11,677,567 B2
(45) Date of Patent: Jun. 13, 2023

(54) VALIDATING SHARED FILES

(71) Applicant: Citrix Systems, Inc., Fort Lauderdale, FL (US)

(72) Inventors: Praveen Raja Dhanabalan, Karnataka (IN); Aayush Bhala, Karnataka (IN); Shubham Choudhary, Karnataka (IN)

(*) Notice: Subject to any disclaimer, the term of this patent is extended or adjusted under 35 U.S.C. 154(b) by 102 days.

(21) Appl. No.: 17/141,602

(22) Filed: Jan. 5, 2021

(65) Prior Publication Data

US 2022/0217001 A1   Jul. 7, 2022

(51) Int. Cl.
*H04L 9/32*   (2006.01)
*H04L 9/08*   (2006.01)

(52) U.S. Cl.
CPC ............ *H04L 9/3263* (2013.01); *H04L 9/088* (2013.01)

(58) Field of Classification Search
CPC ....... H04L 9/3263; H04L 9/088; H04L 9/321; H04L 9/3247; H04L 9/3268
See application file for complete search history.

(56) References Cited

U.S. PATENT DOCUMENTS

| | | | | |
|---|---|---|---|---|
| 2003/0114144 A1* | 6/2003 | Minemura | ............... | H04L 63/12 455/410 |
| 2009/0319796 A1* | 12/2009 | Kim | ....................... | H04L 9/3263 713/176 |
| 2010/0235826 A1* | 9/2010 | Garcia | ....................... | G06F 8/65 709/224 |
| 2016/0149910 A1* | 5/2016 | Luque | ................... | H04L 63/061 713/171 |
| 2017/0070841 A1* | 3/2017 | Shalunov | ................ | H04W 4/80 |
| 2018/0365447 A1* | 12/2018 | Rice | ........................ | H04L 9/3247 |
| 2019/0289059 A1* | 9/2019 | Vanahalli | .............. | H04L 63/061 |
| 2020/0252202 A1* | 8/2020 | Madl | .................... | G06F 21/6218 |
| 2021/0173902 A1* | 6/2021 | Tsai | ......................... | G06F 21/57 |
| 2022/0166633 A1* | 5/2022 | Whittaker | ............. | H04L 9/3247 |

OTHER PUBLICATIONS

Crawford, Douglas, "How, why, and when you should hash check", ProPrivacy, https://proprivacy.com/guides/how-why-and-when-you-should-hash-check, retrieved Jan. 5, 2021.
"How to Check the Integrity of a File?", Logsign, https://blog.logsign.com/how-to-check-the-integrity-of-a-file/, retrieved Jan. 5, 2021.

* cited by examiner

*Primary Examiner* — Vu V Tran

(57) ABSTRACT

A computing device may receive a file previously uploaded by another device, and may validate the received file using data including a first value encrypted based on a document (e.g., a digital certificate or identification certificate) of the uploading device. The computing device may determine the validity of the certificate based on a certificate of a remote computing device to which the file was uploaded, and may decrypt the first value using a key of the certificate of the uploading device. The computing device may determine a second value for the received file and may determine validity of the received file based on a match of the first value and the second value.

16 Claims, 14 Drawing Sheets

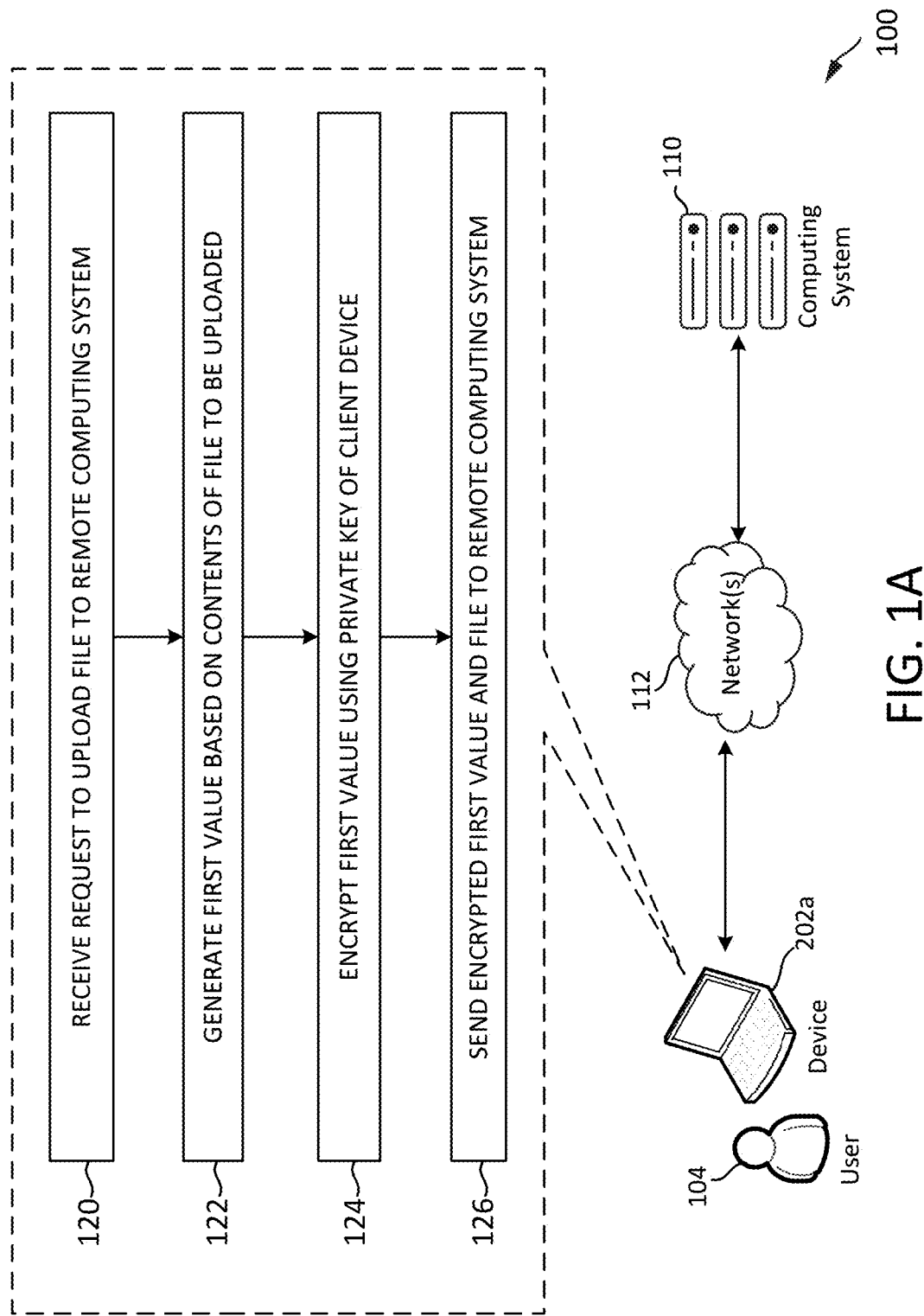

US 11,677,567 B2

VALIDATING SHARED FILES

BACKGROUND

Various file sharing systems have been developed that allow users to share files or other data. ShareFile®, offered by Citrix Systems, Inc., of Fort Lauderdale, Fla., is one example of such a file sharing system.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method performed by a first client device involves receiving a file and data, the file having been previously uploaded by a second client device to a remote computing system and the data including a first value encrypted based on a certificate of the second client device. The method further involves determining validity of the certificate of the second client device based on another certificate of the remote computing system, decrypting the first value with use of a key of the certificate of the second client device in response to validation of the certificate, determining a second value for the received file, and determining validity of the received file based on a match of the first value and the second value.

In some disclosed embodiments, a system comprises a first client device, a second client device and a remote computing system, and the first client device comprises at least one processor, and at least one computer-readable medium encoded with instruction which, when executed by the at least one processor, cause the first client device to receive a file and data, the file having been previously uploaded by the second client device to the remote computing system and the data including a first value encrypted based on a certificate of the second client device, determine validity of the certificate of the second client device based on another certificate of the remote computing system, decrypt the first value with use of a key of the certificate of the second client device in response to validation of the certificate, determine a second value for the received file, and determine validity of the received file based on a match of the first value and the second value.

In some disclosed embodiments, a method performed by a computing system involves receiving a file and a first value from a first client device, the first value being encrypted based on contents of the file, decrypting the first value with use of a key of a certificate of the first client device, generating a second value for the file, determining a match of the first value and the second value, and generating data in response to the match of the first value and the second value, so as to enable download of the file by a second client device.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1A is a diagram of how a client device may upload a file to a remote computing device in accordance with the present disclosure;

DETAILED DESCRIPTION

Figure 1B:
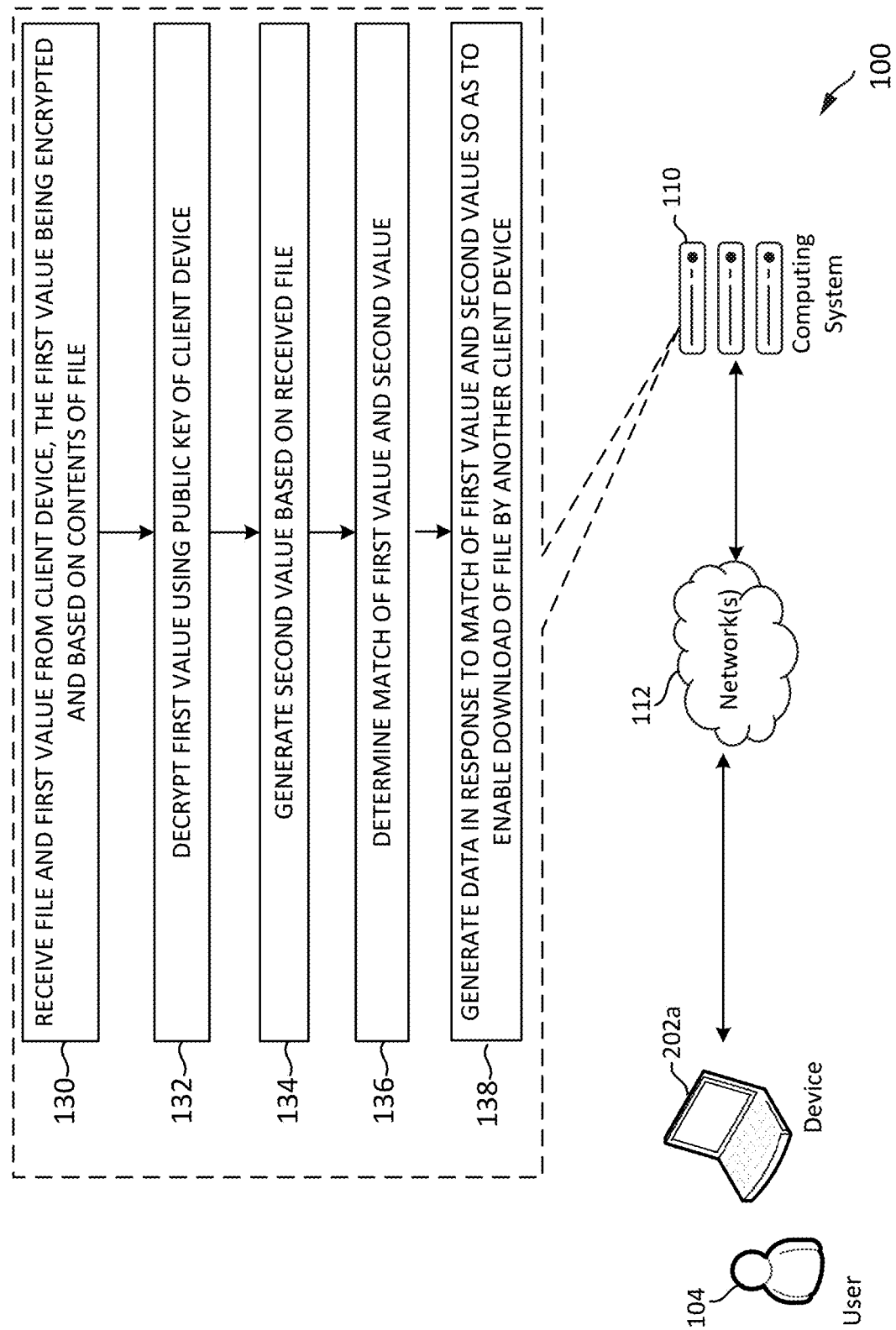
FIG. 1B is a diagram of how a remote computing device may validate a file for upload in accordance with the present disclosure.

For purposes of reading the description of the various embodiments below, the following descriptions of the sections of the specification and their respective contents may be helpful:

Section A provides an introduction to example embodiments of a validation system for shared files;

Section B describes a network environment which may be useful for practicing embodiments described herein;

Section D describes a computing system which may be useful for practicing embodiments described herein.

Section E describes embodiments of systems and methods for delivering shared resources using a cloud computing environment;

Section F describes example embodiments of systems for providing file sharing over networks;

Section G provides a more detailed description of example embodiments of the validation system for shared files introduced above in Section A; and Section H describes example implementations of methods, systems/devices, and computer-readable media in accordance with the present disclosure.

A. Introduction to Illustrative Embodiments of a Validation System for Shared Files Various file sharing systems have been developed that allow users to share files with other users over a network. An example of such a file sharing system 504 is described below (in Section E) in connection with FIGS. 5A-C. As explained in Section E, in some implementations, one client device 202 may upload a copy of a file 502 (shown in FIG. 5A) to a central repository of the file sharing system 504, such as the storage system 512 shown in FIGS. 5A-C, and another client device 202 may then download a copy of that file 502 from the same repository. As Section E also describes, in some implementations, an access management system 506 may regulate the circumstances in which files 502 may be uploaded and/or downloaded to/from the storage system 508 by various client devices 202.

A file may be altered, replaced or otherwise tampered with while being downloaded by a user. For example, a malicious entity may intercept the file being transmitted from a server to a device for download. The malicious entity may tamper with the contents of the file. In some cases, the malicious entity may proxy the connection to download a different file. In other cases, the malicious entity may redirect the user to a different server to download a different file. The modified file may include malware that could infect the device, or may provide the malicious entity access to the device.

One existing technique to check the integrity of the file received at the device when downloading the file is to perform a hash check. In this technique, a website publishes a hash for the file, along with the file to be downloaded. The user, who downloads the file, does the following: (1) downloads the file from the server; (2) uses a tool on the device to compute the hash for the received file; (3) compares the hash with the hash published by the website; and (4) if both hashes match, determines that the file is valid.

Another existing technique to check the integrity of the downloaded file is called Pretty Good Privacy (PGP). In this technique, the user: (1) downloads the file from the server; (2) downloads the hash and the PGP signature from a website; (3) downloads the PGP public key from the website from which the user downloaded the file or another website; (4) uses the PGP key to check that the hash file is not tampered with; and (5) computes the hash of the received file and compares it to the hash file.

While these two techniques are widely used, they can still be vulnerable to attacks from a malicious entity. For example, the malicious entity could perform a Man In The Middle (MITM) attack by downgrading an HTTPS connection to an HTTP connection, so when a download request comes in from a device, the malicious entity could send a malicious file to the device instead of the requested file. The malicious entity could also send a fake signature and key, and the user may perform the integrity checks per the above existing techniques and erroneously believe that the received file is valid.

In another example attack that the existing techniques are vulnerable to, a malicious entity could DNS spoof for the server IP, redirect the user to the wrong server, and make the user download a malicious file and corresponding fake signatures and keys. The user may perform the integrity checks per the above existing techniques and erroneously believe that the received file is valid. In yet another example attack, a malicious entity could proxy a TLS connection from the device, and the user may receive an invalid certificate from the malicious entity. The user, however, may bypass a security warning at the device to access the file.

The above example attacks could be prevented if a user were to follow certain strict security protocols. However, users may not always be aware of such strict security protocols and may not be as security savvy as needed to recognize such attacks. Moreover, the steps of the existing techniques generally need to be actively performed by the user to check the integrity of the file, and sometimes the user may not know to perform such steps, may not put in the effort to perform the steps, or may not have the time to perform the steps.

The inventors have recognized and appreciated that the existing techniques for checking the integrity of a file are vulnerable to attacks, and that some users may not be security savvy enough to recognize such attacks or to perform the steps of the existing techniques.

Offered are systems and techniques for checking the integrity of a file downloaded from a server (such as one hosting the file sharing system 504) to a client device 202, and also for checking the integrity of a file uploaded to such a server from such a client device 202. In some implementations, a file validation system 100 (examples of which are described below in connection with FIGS. 1A-C) may be configured to cause a client device 202 to automatically validate a file downloaded from the file sharing system 504 before enabling a user to access the downloaded file. In some embodiments, the file validation system 100 may further be configured to cause the file sharing system 504 to automatically validate the file before uploading it to the file sharing system 504 so that the file can be downloaded by other client devices 202. The systems and techniques described herein may prevent a user (who is not security savvy) from accessing a malicious file instead of the requested file. The systems and techniques described herein may support various types of interactions between the user and the file sharing system 504, such as file download, file upload, and file auto synchronization.

In some implementations, the file validation system 100 may certify multiple client devices 202 as users of the file sharing system 504 and may include a public-private key infrastructure. The file sharing system 504 may include or operate in conjunction with a certificate authority that is configured to certify the client devices 202 for the file sharing system 504. In some implementations, as part of the certification process, a client device 202 may generate a key pair including a private key and a public key, generate a certificate including the public key, and send a certificate signing request to the certificate authority. The certificate authority may sign the certificate, provide the signed certificate to the client device 202, and save a copy of the signed certificate. The certificate may be identified, for example, using a name of the client device 202 or other identifying data.

FIG. 1A shows an example of how a user 104 of a file validation system 100 may upload a file to a remote computing system 110 in accordance with some embodiments of the present disclosure. In some implementations, the computing system 110 may represent an enhanced version of the file sharing system 504 described in Section E. In some embodiments, the computing system 110 may include one or more servers. The client device 202*a* may be in communication with the computing system 110 using one or more networks 112.

As shown in FIG. 1A, in some implementations, the client device 202*a* of the file validation system 100 may be configured to perform steps 120-126. In some implementations, a file sharing application (such as the file management application 513 described in Section E) may be installed on the client device 202*a*, and a user 104 may use the file sharing application to upload a file to the computing system 110.

At a step 120, the client device 202*a*, via the file sharing application in some embodiments, may receive a request to upload a file to the remote computing system 110. Such a request may, for example, correspond to a user 104 selecting or clicking a button or otherwise providing an input indicating the user 104 wants to upload the file. The user 104 may also select or otherwise indicate, at the client device 202*a* via the file sharing application in some embodiments, the file to be uploaded to the remote computing system 110.

At a step 122, the client device 202*a*, via the file sharing application in some embodiments, may generate a first value that is based on the content of the file to be uploaded. In some embodiments, the first value may, for example, be a hash value that is determined using the contents of the file.

At a step 124, the client device 202*a*, via the file sharing application in some embodiments, may encrypt the first value using a private key of the client device 202*a*. The client device 202*a* may have previously been certified by a certificate authority (CA) of the remote computing system 110. An example certification process is described in detail below in relation to FIG. 6B. When the CA certifies the client device 202*a*, the CA may indicate that the client device 202*a* is authorized, approved, or otherwise enabled to encrypt data using the private key of the client device 202*a*, where the data is to be sent to the remote computing system 110, and that the data may relate to files to be uploaded (e.g., hash values of files to be uploaded) to the remote computing system 110.

At a step 126, the client device 202*a*, via the file sharing application in some embodiments, may send the encrypted first value and a copy of the file to the remote computing system 110. In some implementations, the steps 122-126 may be performed by the client device 202*a* automatically in response to receiving the request, at the step 120, to upload a file to the remote computing system 110. In this manner, the client device 202*a* may send a copy of the file to be uploaded to the remote computing system 110, along with the first value (which is based on the contents of the file) that is encrypted using the client device's 202*a* private key.

In some cases, there may be an opportunity for malicious entities to intercept transmission of the copy of the file from the client device 202*a* to the remote computing system 110. Malicious entities may, for example, alter the copy of the file or may replace the copy of the file with another file, and may send the altered copy or replaced copy to the remote computing system 110. Thus, the remote computing system 110 may receive a file that was not intended by the user 104 to be uploaded to the remote computing system 110.

To validate the file received at the remote computing system 110 is the one the user 104 intended to upload, the remote computing system 110 may use the encrypted first value (determined at the step 124), as will now be described in relation to FIG. 1B.

FIG. 1B shows an example of how the remote computing system 110 may validate the file to be uploaded. At a step 130, the remote computing system 110 may receive a file and a first value from the client device 202*a*, where the first value may be encrypted and may be based on contents of the file to be uploaded, as described above. The received file may be the copy of the file that the user 104 intends to upload to the remote computing system 110.

At a step 132, the remote computing system 110, may decrypt the first value using a public key of the client device 202*a*. The public key may be a part of a pair of keys of the client device 202*a*, where the pair of keys includes the private key used by the client device 202*a* in the step 124 to encrypt the first value. The public key of the client device 202*a* may be stored by the CA of the remote computing system 110. In some implementations, the remote computing system 110 may retrieve and/or access the public key based on a name of the client device 202*a* or other identifying information of the client device 202*a*.

At a step 134, the remote computing system 110 may generate a second value for the file received at the step 130. In some embodiments, the second value may be a hash value based on the contents of the received file. At a step 136, the remote computing system 110 may determine a match of the first value (received from the client device 202*a*, and decrypted in the step 132) and the second value. Based at least in part on determining that the first value matches the second value, the remote computing system 110 may determine that the received file was not altered or replaced, and matches the file the user 104 intended to upload to the remote computing system 110.

At a step 138, the remote computing system 110 may generate data (e.g., metadata) in response to the match of the first value and the second value so as to enable download of the file by another client device 202. The remote computing system 110 may store the received file in storage (e.g., storage 512 of the file sharing system 504) along with the data, so that another client device (e.g., client device 202*b*) may subsequently download the file. In some embodiments, the data may include the encrypted first value (received at the step 130). In some embodiments, the data may also include a name of the client device 202*a* and/or other information identifying or relating to the client device 202*a*. In some embodiments, the data may include a certificate of the remote computing system 110 or the CA of the remote computing system 110. As will now be described in connection with FIG. 1C, the client device 202*b* may use the data to validate the file received at the client device 202*b* as part of a download request.

Figure 1C:
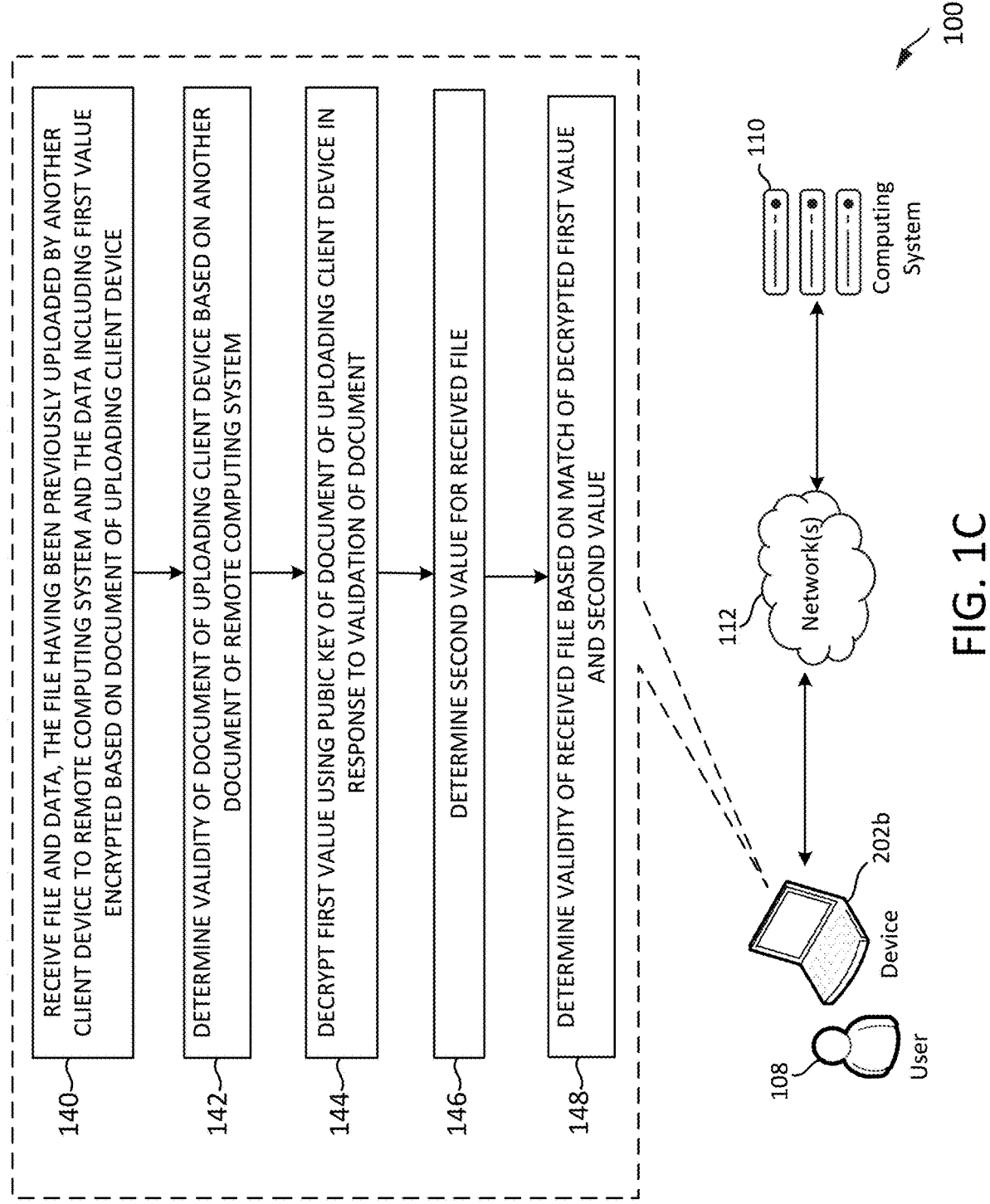
FIG. 1C is a diagram of how a client device may validate a file for download in accordance with the present disclosure.

FIG. 1C shows an example of how another client device 202*b* may validate a file received from the remote computing system 110, where the file was previously uploaded by the client device 202*a* and validated by the remote computing system 110. As shown in FIG. 1C, in some implementations, the client device 202*b* of the file validation system 100 may be configured to perform steps 140-148. In some implementations, a file sharing application (such as the file management application 513 described in Section E) may be installed on the client device 202*b*, and a user 108 may use the file sharing application to download a file from the remote computing system 110.

The client device 202*b*, via the file sharing application in some embodiments, may receive a request to download a file from the remote computing system 110. Such a request may, for example, correspond to the user 108 selecting or clicking a button or otherwise providing an input indicating the user 108 wants to download the file. The user 108 may also select or otherwise indicate, at the client device 202*b* via the file sharing application in some embodiments, which file is to be downloaded to the client device 202*b*.

As shown in FIG. 1C, at a step 140, the client device 202*b* may receive a file and data (e.g., metadata), where the file may have been previously uploaded by the client device 202*a* to the remote computing system 110, and the data may include a first value encrypted based on a certificate of the client device 202*a*. In some cases, there may be an opportunity for malicious entities to intercept transmission of the file from the remote computing system 110 to the client device 202*b*. Malicious entities may, for example, alter the file or may replace the file with another file, and may send the altered file or replaced file to the client device 202*b*. Thus, the client device 202*b* may receive a file that was not intended by the user 108 to be downloaded from the remote computing system 110.

The client device 202*b* may, via the file sharing application in some embodiments, validate the received file. In particular, beginning a step 142, the client device 202*b* may determine the validity of a document (e.g., a digital certificate or identification certificate) of the client device 202*a* based on a document (e.g., a digital certificate or identification certificate) of the remote computing system 110. In some embodiments, the client device 202*b* may already have the certificate of the client device 202*a*, e.g., if the client device 202*b* previously downloaded a file uploaded to the remote computing system 110 by the client device 202*a*, and the client device 202*b* previously performed the validation process with respect to such a file. In other embodiments, the client device 202*b* may not yet have the certificate of the client device 202*a*, and the client device 202*b* may request the certificate of the client device 202*a* from the remote computing system 110 or the CA of the remote computing system 110. The client device 202*b* may determine whether or not the certificate of the client device 202*a* is available at the client device 202*b* based on the name of the client device 202*a* (and/or other information identifying the client device 202*a*) included in the data received at the step 140. In determining the validity of the certificate of the client device 202*a*, the client device 202*b* may determine whether the certificate of the client device 202*a* was certified/signed using the certificate of the remote computing system 110. In some embodiments, the certificate of the remote computing system 110 may be included in the data. In some embodiments, the client device 202*b* may request a certificate of the remote computing system 110 from the remote computing system 110 or the CA of the remote computing system 110.

At a step 144, the client device 202*b* may, via the file sharing application in some embodiments, decrypt the first value using a public key of the certificate of the client device 202*a* in response to validation of the certificate of the client device 202*a*. As described above, in some embodiments, the certificate and the public key of the client device 202*a* may already be available at the client device 202*b*, and in other embodiments, if the public key of the client device 202*a* is not available at the client device 202*b*, then the client device 202*b* may request it from the remote computing system 110 or the CA of the remote computing system 110.

At a step 146, the client device 202*b* may, via the file sharing application in some embodiments, determine a second value for the received file. In some embodiments, the second value may be a hash value based on the contents of the received file and/or other information related to the received file. At a step 148, the client device 202*b* may, via the file sharing application in some embodiments, determine the validity of the received file based on a match of the first value (received from the remote computing system 110 in the step 140 and decrypted in the step 144) and the second value (generated in the step 146). Based at least in part on determining that the first value matches the second value, the client device 202*b* may determine that the received file was not altered or replaced, and matches the file the user 108 intended to download from the remote computing system 110. After validating the received file, the client device 202*b* may enable access by the user 108 to the received file.

In some implementations, the steps 142-148 may be performed by the client device 202*b* automatically in response to receiving the file and the data (in the step 140) prior to enabling the user 108 access to the file. In this manner, the user 108 does not have to be responsible to taking steps to validate the file. As noted previously, this can be particularly beneficial for users who may not even know which steps to take or may forget to take the steps to validate the file.

Additional details and example implementations of embodiments of the present disclosure are set forth below in Section F, following a description of example systems and network environments in which such embodiments may be deployed.

B. Network Environment

Figure 2:
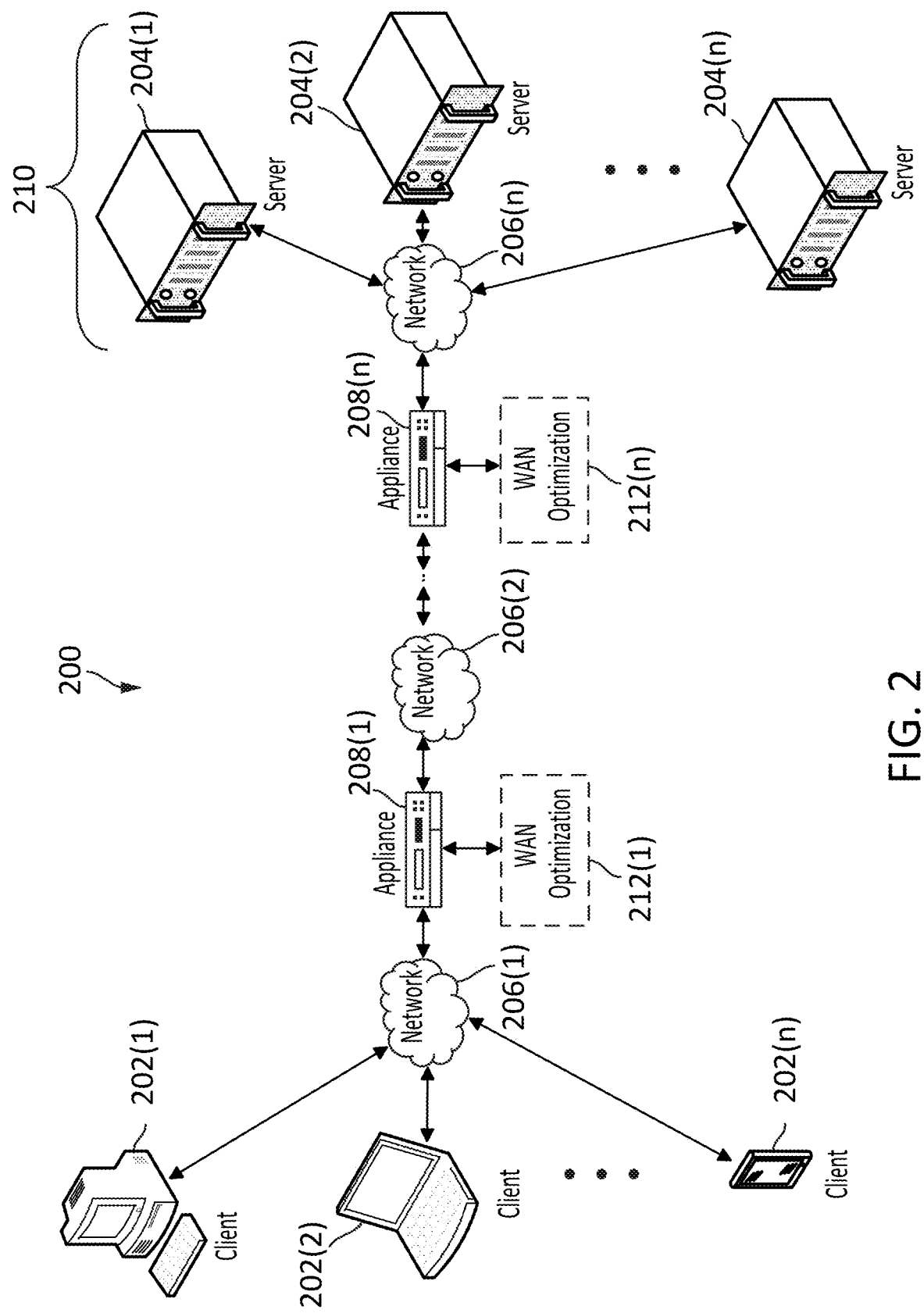
FIG. 2 is a diagram of a network environment in which some embodiments of the present disclosure may be deployed.

Referring to FIG. 2, an illustrative network environment 200 is depicted. As shown, the network environment 200 may include one or more clients 202(1)-202(*n*) (also generally referred to as local machine(s) 202 or client(s) 202) in communication with one or more servers 204(1)-204(*n*) (also generally referred to as remote machine(s) 204 or server(s) 204) via one or more networks 206(1)-206(*n*) (generally referred to as network(s) 206). In some embodiments, a client 202 may communicate with a server 204 via one or more appliances 208(1)-208(*n*) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(*n*) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(*n*), as well as the network 206(2), may be public networks. In yet other embodiments, all three of the network 206(1), the network 206(2) and the network 206(*n*) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of + an organization.

C. Computing Environment

Figure 3:
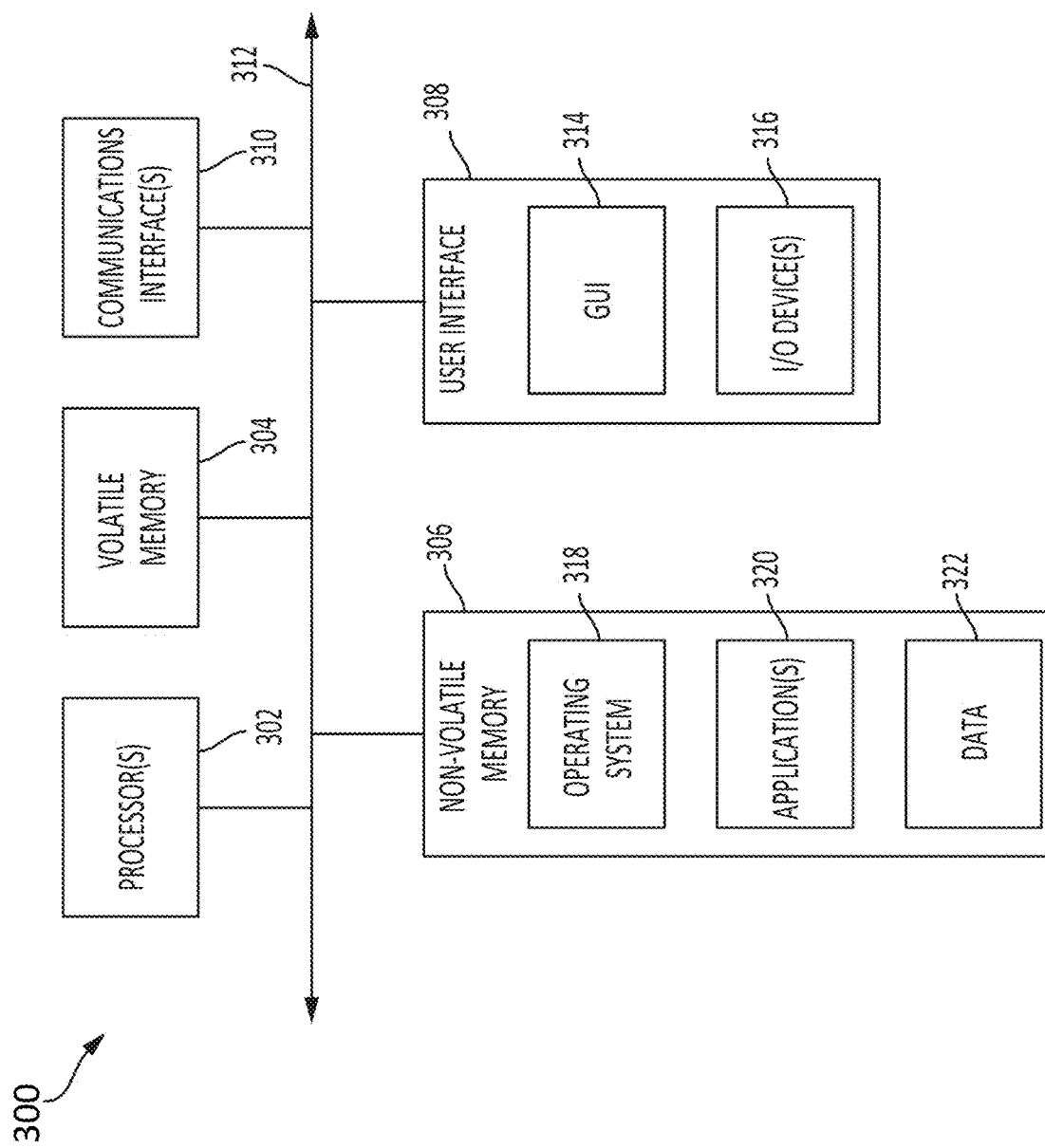
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
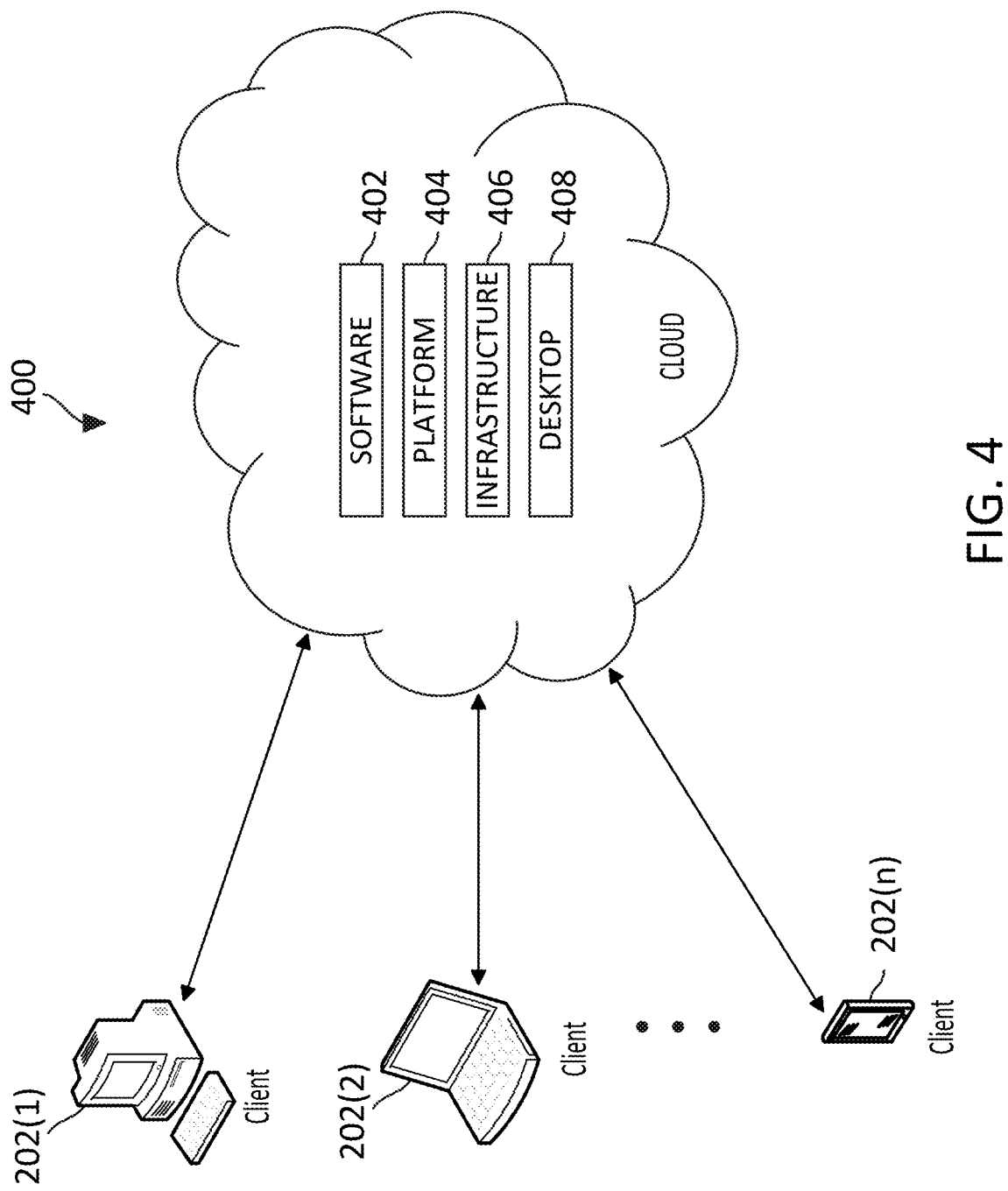
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHT-SCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Providing File Sharing Over Network(s)

Figure 5A:
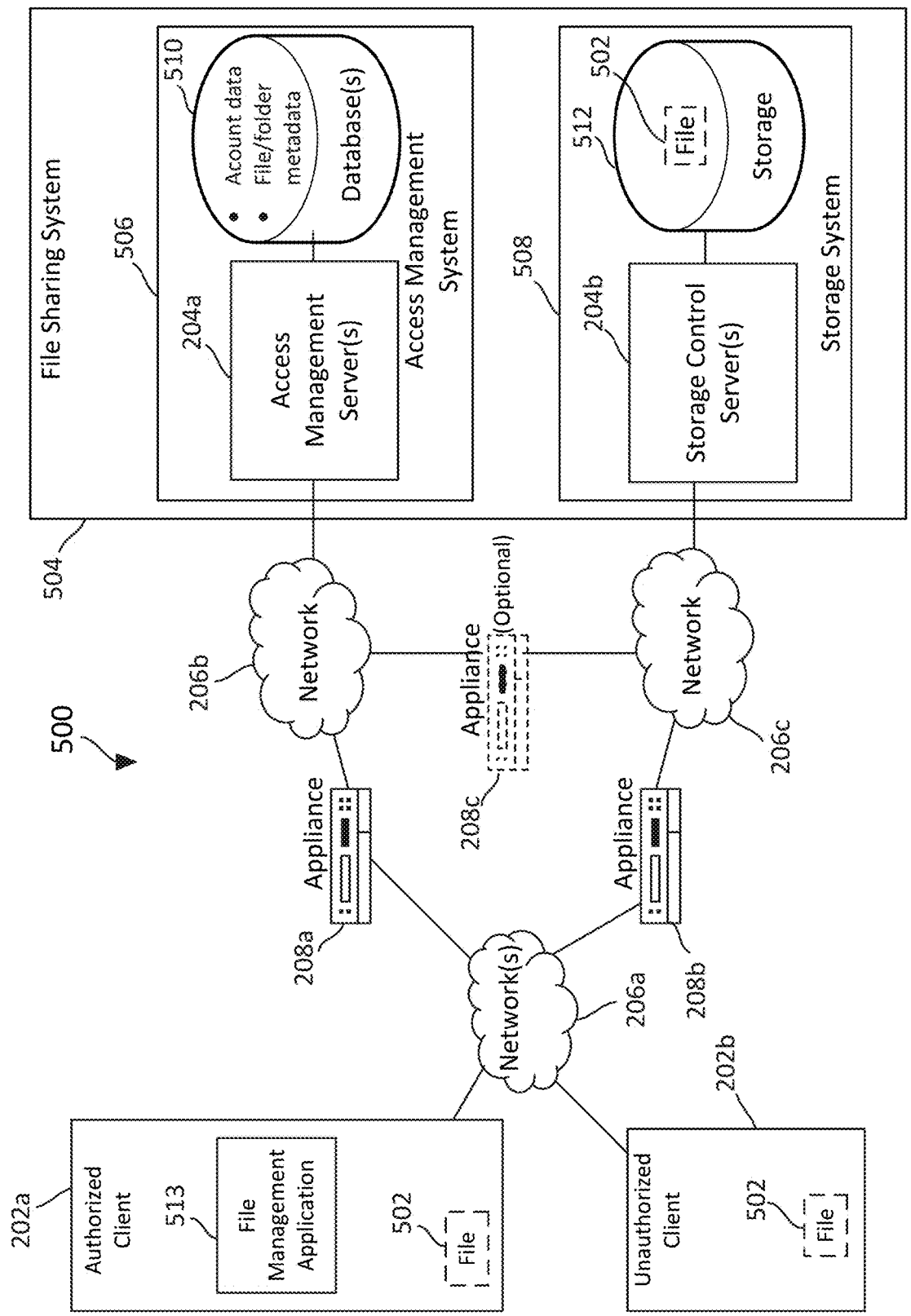
FIG. 5A is a diagram illustrating how a network computing environment like one shown in FIG. 2 may be configured to allow clients access to an example embodiment of a file sharing system.

FIG. 5A shows an example network environment 500 for allowing an authorized client 202a and/or an unauthorized client 202b to upload a file 502 to a file sharing system 504 or download a file 502 from the file sharing system 504. The authorized client 202a may, for example, be a client 202 operated by a user having an active account with the file sharing system 504, while the unauthorized client 202b may be operated by a user who lacks such an account. As shown, in some embodiments, the authorized client 202a may include a file management application 513 with which a user of the authorized client 202a may access and/or manage the accessibility of one or more files 502 via the file sharing system 504. The file management application 513 may, for example, be a mobile or desktop application installed on the authorized client 202a (or in a computing environment accessible by the authorized client). The ShareFile® mobile app and the ShareFilex desktop app offered by Citrix Systems, Inc., of Fort Lauderdale, Fla., are examples of such preinstalled applications. In other embodiments, rather than being installed on the authorized client 202a, the file management application 513 may be executed by a web server (included with the file sharing system 504 or elsewhere) and provided to the authorized client 202a via one or more web pages.

As FIG. 5A illustrates, in some embodiments, the file sharing system 504 may include an access management system 506 and a storage system 508. As shown, the access management system 506 may include one or more access management servers 204a and a database 510, and the storage system 508 may include one or more storage control servers 204b and a storage medium 512. In some embodiments, the access management server(s) 204a may, for example, allow a user of the file management application 513 to log in to his or her account, e.g., by entering a user name and password corresponding to account data stored in the database 510. Once the user of the client 202a has logged in, the access management server 204a may enable the user to view (via the authorized client 202a) information identifying various folders represented in the storage medium 512, which is managed by the storage control server(s) 204b, as well as any files 502 contained within such folders. File/folder metadata stored in the database 510 may be used to identify the files 502 and folders in the storage medium 512 to which a particular user has been provided access rights.

In some embodiments, the clients 202a, 202b may be connected to one or more networks 206a (which may include the Internet), the access management server(s) 204a may include webservers, and an appliance 208a may load balance requests from the authorized client 202a to such webservers. The database 510 associated with the access management server(s) 204a may, for example, include information used to process user requests, such as user account data (e.g., username, password, access rights, security questions and answers, etc.0 file and folder metadata (e.g., name, description, storage location, access rights, source IP address, etc.), and logs, among other things. Although the clients 202a, 202b are shown is FIG. 5A as stand-alone computers, it should be appreciated that one or both of the clients 202a, 202b shown in FIG. 5A may instead represent other types of computing devices or systems that can be operated by users. In some embodiments, for example, one or both of the authorized client 202a and the unauthorized client 202b may be implemented as a server-based virtual computing environment that can be remotely accessed using a separate computing device operated by users, such as described above.

In some embodiments, the access management system 506 may be logically separated from the storage system 508, such that files 502 and other data that are transferred between clients 202 and the storage system 508 do not pass through the access management system 506. Similar to the access management server(s) 204a, one or more appliances 208b may load-balance requests from the clients 202a, 202b received from the network(s) 206a (which may include the Internet) to the storage control server(s) 204b. In some embodiments, the storage control server(s) 204b and/or the storage medium 512 may be hosted by a cloud-based service provider (e.g., Amazon Web Services™ or Microsoft Azure™). In other embodiments, the storage control server(s) 204b and/or the storage medium 512 may be located at a data center managed by an enterprise of a client 202, or may be distributed among some combination of a cloud-based system and an enterprise system, or elsewhere.

After a user of the authorized client 202a has properly logged in to an access management server 204a, the server 204a may receive a request from the client 202a for access to one of the files 502 or folders to which the logged in user has access rights. The request may either be for the authorized client 202a to itself to obtain access to a file 502 or folder or to provide such access to the unauthorized client 202b. In some embodiments, in response to receiving an access request from an authorized client 202a, the access management server 204a may communicate with the storage control server(s) 204b (e.g., either over the Internet via appliances 208a and 208b or via an appliance 208c positioned between networks 206b and 206c) to obtain a token generated by the storage control server 204b that can subsequently be used to access the identified file 502 or folder.

In some implementations, the generated token may, for example, be sent to the authorized client 202a, and the authorized client 202a may then send a request for a file 502, including the token, to the storage control server(s) 204b. In other implementations, the authorized client 202a may send the generated token to the unauthorized client 202b so as to allow the unauthorized client 202b to send a request for the file 502, including the token, to the storage control server(s) 204b. In yet other implementations, an access management server 204a may, at the direction of the authorized client 202a, send the generated token directly to the unauthorized client 202b so as to allow the unauthorized client 202b to send a request for the file 502, including the token, to the storage control server(s) 204b. In any of the forgoing scenarios, the request sent to the storage control server(s) 204b may, in some embodiments, include a uniform resource locator (URL) that resolves to an internet protocol (IP) address of the storage control server(s) 204b, and the token may be appended to or otherwise accompany the URL. Accordingly, providing access to one or more clients 202 may be accomplished, for example, by causing the authorized client 202a to send a request to the URL address, or by sending an email, text message or other communication including the token-containing URL to the unauthorized client 202b, either directly from the access management server(s) 204a or indirectly from the access management server(s) 204a to the authorized client 202a and then from the authorized client 202a to the unauthorized client 202b. In some embodiments, selecting the URL or a user interface element corresponding to the URL, may cause a request to be sent to the storage control server(s) 204b that either causes a file 502 to be downloaded immediately to the client that sent the request, or may cause the storage control server 204b to return a webpage to the client that includes a link or other user interface element that can be selected to effect the download.

In some embodiments, a generated token can be used in a similar manner to allow either an authorized client 202a or an unauthorized client 202b to upload a file 502 to a folder corresponding to the token. In some embodiments, for example, an "upload" token can be generated as discussed above when an authorized client 202a is logged in and a designated folder is selected for uploading. Such a selection may, for example, cause a request to be sent to the access management server(s) 204a, and a webpage may be returned, along with the generated token, that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In some embodiments, sending a request including such a token to the storage control server(s) 204b (e.g., by selecting a URL or user-interface element included in an email inviting the user to upload one or more files 502 to the file sharing system 504), a webpage may be returned that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In the described embodiments, the clients 202, servers 204, and appliances 208 and/or 212 (appliances 212 are shown in FIG. 2) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may correspond to respective computing systems, groups of computing systems, or networks of distributed computing systems, such as computing system 300 shown in FIG. 3.

Figure 5B:
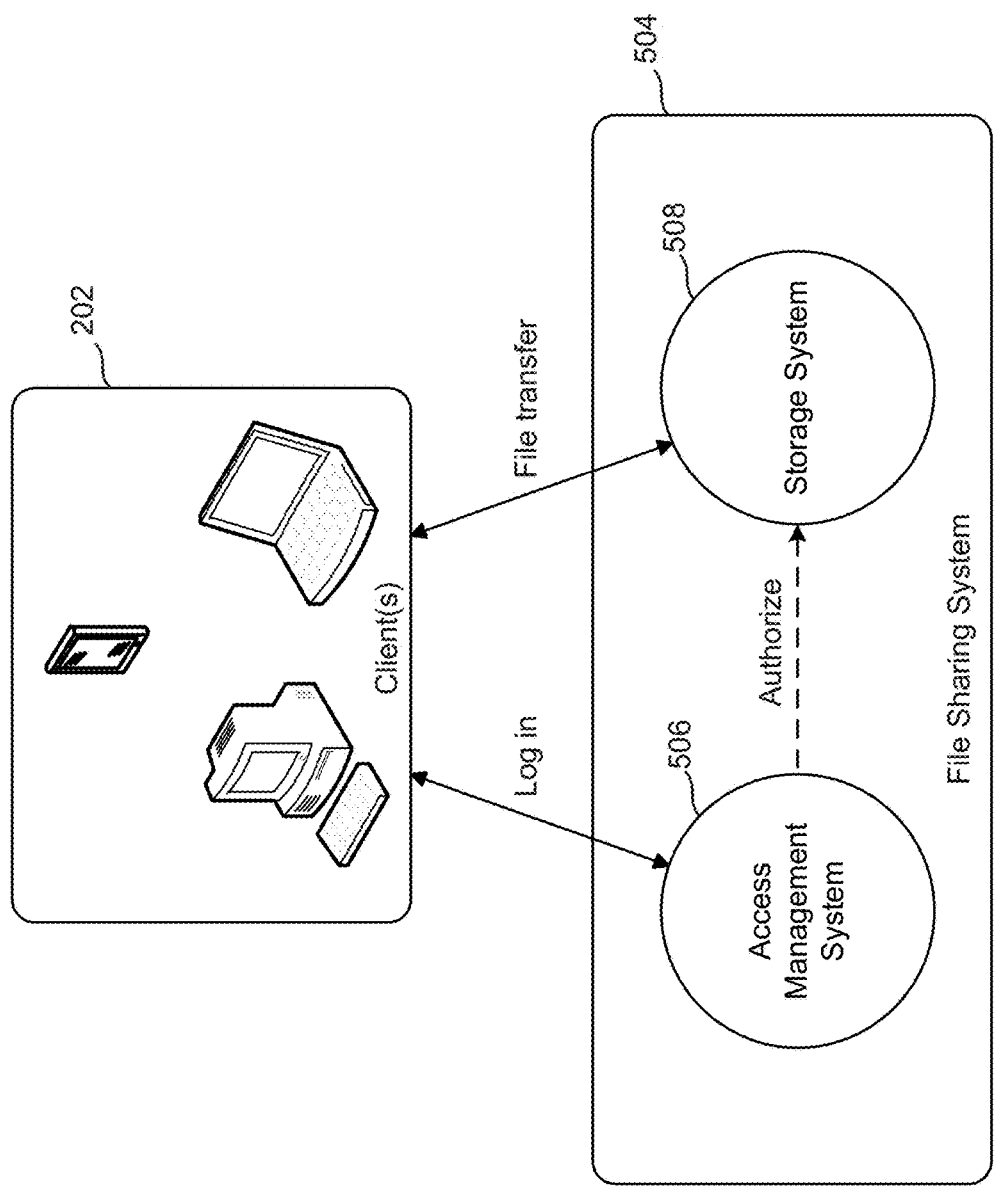
FIG. 5B is a diagram illustrating certain operations that may be performed by the file sharing system shown in FIG. 5A in accordance with some embodiments.

As discussed above in connection with FIG. 5A, in some embodiments, a file sharing system may be distributed between two sub-systems, with one subsystem (e.g., the access management system 506) being responsible for controlling access to files 502 stored in the other subsystem (e.g., the storage system 508). FIG. 5B illustrates conceptually how one or more clients 202 may interact with two such subsystems.

As shown in FIG. 5B, an authorized user operating a client 202, which may take on any of numerous forms, may log in to the access management system 506, for example, by entering a valid user name and password. In some embodiments, the access management system 506 may include one or more webservers that respond to requests from the client 202. The access management system 506 may store metadata concerning the identity and arrangements of files 502 (shown in FIG. 5A) stored by the storage system 508, such as folders maintained by the storage system 508 and any files 502 contained within such folders. In some embodiments, the metadata may also include permission metadata identifying the folders and files 502 that respective users are allowed to access. Once logged in, a user may employ a user-interface mechanism of the client 202 to navigate among folders for which the metadata indicates the user has access permission.

In some embodiments, the logged-in user may select a particular file 502 the user wants to access and/or to which the logged-in user wants a different user of a different client 202 to be able to access. Upon receiving such a selection from a client 202, the access management system 506 may take steps to authorize access to the selected file 502 by the logged-in client 202 and/or the different client 202. In some embodiments, for example, the access management system 506 may interact with the storage system 508 to obtain a unique "download" token which may subsequently be used by a client 202 to retrieve the identified file 502 from the storage system 508. The access management system 506 may, for example, send the download token to the logged-in client 202 and/or a client 202 operated by a different user. In some embodiments, the download token may a single-use token that expires after its first use.

In some embodiments, the storage system 508 may also include one or more webservers and may respond to requests from clients 202. In such embodiments, one or more files 502 may be transferred from the storage system 508 to a client 202 in response to a request that includes the download token. In some embodiments, for example, the download token may be appended to a URL that resolves to an IP address of the webserver(s) of the storage system 508. Access to a given file 502 may thus, for example, be enabled by a "download link" that includes the URL/token. Such a download link may, for example, be sent the logged-in client 202 in the form of a "DOWNLOAD" button or other user-interface element the user can select to effect the transfer of the file 502 from the storage system 508 to the client 202. Alternatively, the download link may be sent to a different client 202 operated by an individual with which the logged-in user desires to share the file 502. For example, in some embodiments, the access management system 506 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 506 and cut-and-paste or otherwise copy the download link into an email or other message the logged in user can then send to the other client 202 to enable the other client 202 to retrieve the file 502 from the storage system 508.

In some embodiments, a logged-in user may select a folder on the file sharing system to which the user wants to transfer one or more files 502 (shown in FIG. 5A) from the logged-in client 202, or to which the logged-in user wants to allow a different user of a different client 202 to transfer one or more files 502. Additionally or alternatively, the logged-in user may identify one or more different users (e.g., by entering their email addresses) the logged-in user wants to be able to access one or more files 502 currently accessible to the logged-in client 202.

Similar to the file downloading process described above, upon receiving such a selection from a client 202, the access management system 506 may take steps to authorize access to the selected folder by the logged-in client 202 and/or the different client 202. In some embodiments, for example, the access management system 506 may interact with the storage system 508 to obtain a unique "upload token" which may subsequently be used by a client 202 to transfer one or more files 502 from the client 202 to the storage system 508. The access management system 506 may, for example, send the upload token to the logged-in client 202 and/or a client 202 operated by a different user.

One or more files 502 may be transferred from a client 202 to the storage system 508 in response to a request that includes the upload token. In some embodiments, for example, the upload token may be appended to a URL that resolves to an IP address of the webserver(s) of the storage system 508. For example, in some embodiments, in response to a logged-in user selecting a folder to which the user desires to transfer one or more files 502 and/or identifying one or more intended recipients of such files 502, the access management system 506 may return a webpage requesting that the user drag-and-drop or otherwise identify the file(s) 502 the user desires to transfer to the selected folder and/or a designated recipient. The returned webpage may also include an "upload link," e.g., in the form of an "UPLOAD" button or other user-interface element that the user can select to effect the transfer of the file(s) 502 from the client 202 to the storage system 508.

In some embodiments, in response to a logged-in user selecting a folder to which the user wants to enable a different client 202 operated by a different user to transfer one or more files 502, the access management system 506 may generate an upload link that may be sent to the different client 202. For example, in some embodiments, the access management system 506 may send an email or other message to the different client 202 that includes a message indicating that the different user has been authorized to transfer one or more files 502 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 502 the different user wishes to upload to the file sharing system 504. The returned webpage may also include a user-interface element, e.g., in the form of an "UPLOAD" button, that the different user can select to effect the transfer of the file(s) 502 from the client 202 to the storage system 508. In other embodiments, the logged-in user may receive the upload link from the access management system 506 and may cut-and-paste or otherwise copy the upload link into an email or other message the logged-in user can then send to the different client 202 to enable the different client to upload one or more files 502 to the storage system 508.

In some embodiments, in response to one or more files 502 being uploaded to a folder, the storage system 508 may send a message to the access management system 506 indicating that the file(s) 502 have been successfully uploaded, and an access management system 506 may, in turn, send an email or other message to one or more users indicating the same. For user's that have accounts with the file sharing system 504, for example, a message may be sent to the account holder that includes a download link that the account holder can select to effect the transfer of the file 502 from the storage system 508 to the client 202 operated by the account holder. Alternatively, the message to the account holder may include a link to a webpage from the access management system 506 inviting the account holder to log in to retrieve the transferred files 502. Likewise, in circumstances in which a logged-in user identifies one or more intended recipients for one or more to-be-uploaded files 502 (e.g., by entering their email addresses), the access management system 506 may send a message including a download link to the designated recipients (e.g., in the manner described above), which such designated recipients can then use to effect the transfer of the file(s) 502 from the storage system 508 to the client(s) 202 operated by those designated recipients.

Figure 5C:
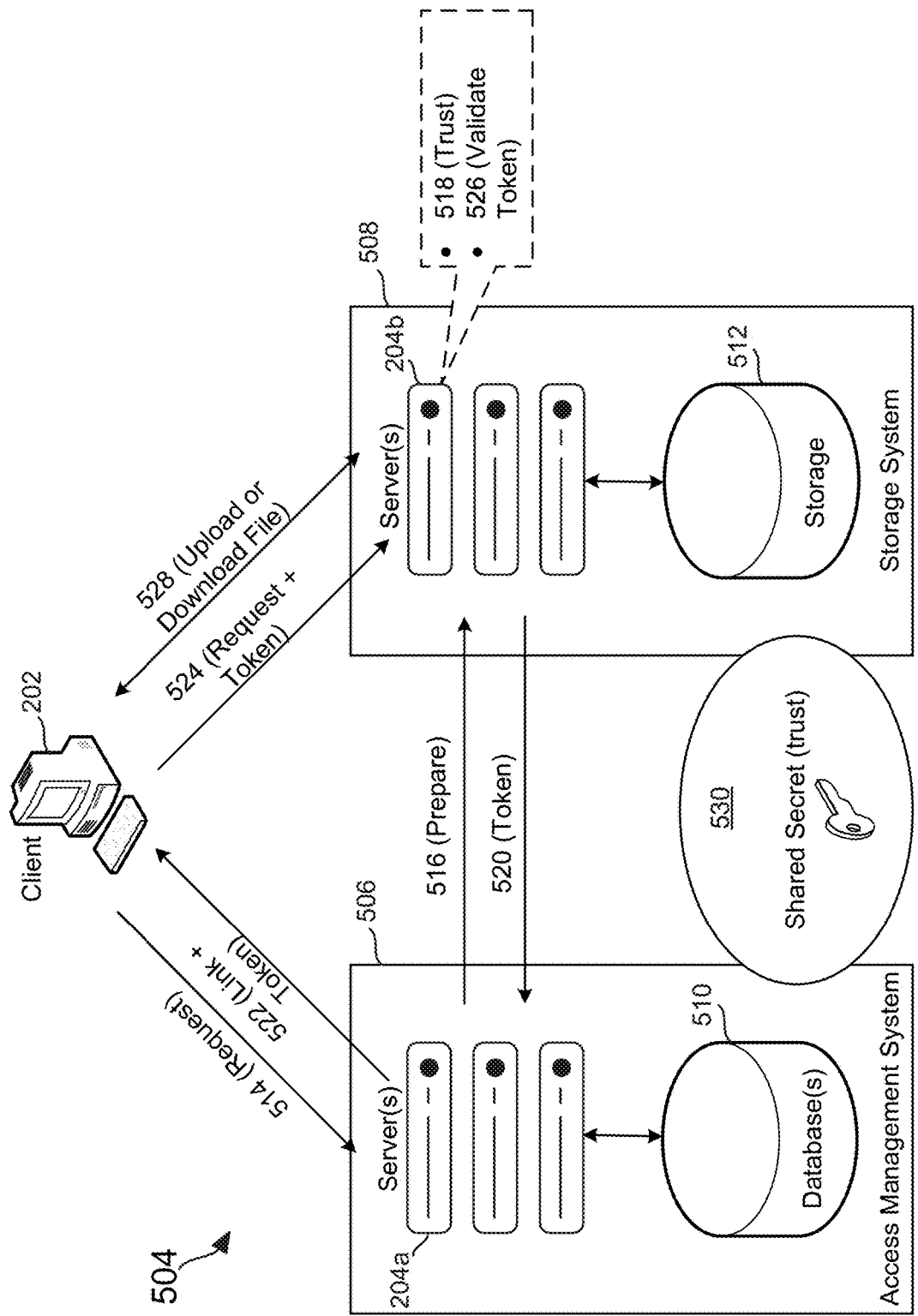
FIG. 5C is a diagram illustrating additional operations that may be performed by the file sharing system shown in FIG. 5A in accordance with some embodiments.

FIG. 5C is a block diagram showing an example of a process for generating access tokens (e.g., the upload tokens and download tokens discussed above) within the file sharing system 504 described in connection with FIGS. 5A and 5B.

As shown, in some embodiments, a logged-in client 202 may initiate the access token generation process by sending an access request 514 to the access management server(s) 204*b*. As noted above, the access request 514 may, for example, correspond to one or more of (A) a request to enable the downloading of one or more files 502 (shown in FIG. 5A) from the storage system 508 to the logged-in client 202, (B) a request to enable the downloading of one or more files 502 from the storage system 508 to a different client 202 operated by a different user, (C) a request to enable the uploading of one or more files 502 from a logged-in client 202 to a folder on the storage system 508, (D) a request to enable the uploading of one or more files 502 from a different client 202 operated by a different user to a folder of the storage system 508, (E) a request to enable the transfer of one or more files 502, via the storage system 508, from a logged-in client 202 to a different client 202 operated by a different user, or (F) a request to enable the transfer of one or more files 502, via the storage system 508, from a different client 202 operated by a different user to a logged-in client 202.

In response to receiving the access request 514, an access management server 204a may send a "prepare" message 516 to the storage control server(s) 204b of the storage system 508, identifying the type of action indicated in the request, as well as the identity and/or location within the storage medium 512 of any applicable folders and/or files 502. As shown, in some embodiments, a trust relationship may be established (step 518) between the storage control server(s) 204b and the access management server(s) 204a. In some embodiments, for example, the storage control server(s) 204b may establish the trust relationship by validating a hash-based message authentication code (HMAC) based on shared secret or key 530).

After the trust relationship has been established, the storage control server(s) 204b may generate and send (step 520) to the access management server(s) 204a a unique upload token and/or a unique download token, such as those as discussed above.

After the access management server(s) 204a receive a token from the storage control server(s) 204b, the access management server(s) 204a may prepare and send a link 522 including the token to one or more client(s) 202. In some embodiments, for example, the link may contain a fully qualified domain name (FQDN) of the storage control server(s) 204b, together with the token. As discussed above, the link 522 may be sent to the logged-in client 202 and/or to a different client 202 operated by a different user, depending on the operation that was indicated by the request.

The client(s) 202 that receive the token may thereafter send a request 524 (which includes the token) to the storage control server(s) 204b. In response to receiving the request, the storage control server(s) 204b may validate (step 526) the token and, if the validation is successful, the storage control server(s) 204b may interact with the client(s) 202 to effect the transfer (step 528) of the pertinent file(s) 502, as discussed above.

F. Detailed Description of Example Embodiments of Validation System for File Sharing In some implementations, when a user (e.g., user 104 or user 108 shown in FIGS. 1A-C) requests to join the file sharing system 504 shown in FIGS. 5A-C (e.g., requests authorization to use the file sharing system 504, requests a login username/password to the file sharing system 504, etc.), the file validation system 100, via a file sharing application on the client device 202, may initiate a certification process to certify the client device 202 with a certificate authority for the file sharing system 504 as described below in relation to FIGS. 6A, 6B, 7A and 7B. After the client device 202 is certified, the user 104 may upload a file to the file sharing system 504 as described herein in relation to FIGS. 1A and 8. The file, to be uploaded to the file sharing system 504, may be validated by the file validation system 100 as described in relation to FIGS. 1B and 9. In response to the user 108 requesting to download the file from the file sharing system 504, the client device 202 of the user 108 may validate the file, prior to enabling access to the file by the user 108, as described in relation to FIGS. 1C and 10.

Figure 6A:
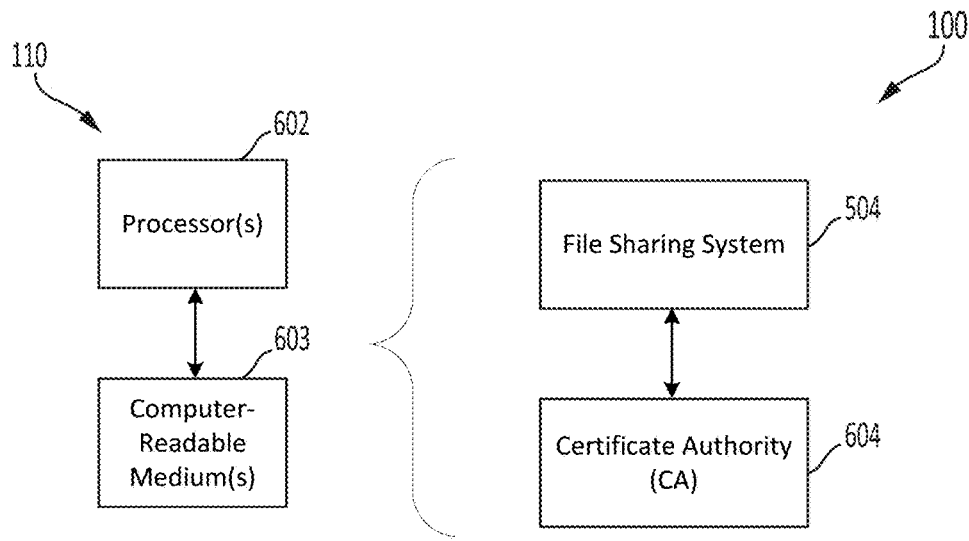
FIG. 6A is diagram illustrating the file sharing system and a certificate authority in accordance with some embodiments.

FIG. 6A shows an example of how a certificate authority may be included in the file validation system 100 introduced above (in Section A) in connection with FIGS. 1A, 1B and 1C in accordance with some embodiments. As shown in FIG. 6A, the file validation system 100 may include one or more processors 602 and one or more computer readable mediums 603 that may be encoded with instructions that can be executed by the processor(s) 602 to cause one or more computing system 110 (e.g., as shown in FIGS. 1A, 1B and 1C) or other computing system to perform various routines. In the illustrated example, the processor(s) 602 and computer-readable medium(s) 603 embody the file sharing system 504 and the certificate authority (CA) 604. The components 504 and 604 may be implemented in any of numerous ways and may be disposed at any of a number of locations within a computing network, such the network environment 200 described above (in Section B) in connection with FIG. 2. In some implementations, for example, the processor(s) 602 and the computer-readable medium(s) 603 embodying one or more such components may be located within one or more of the servers 204 and/or the computing system 300 that are described above (in Sections B and C) in connection with FIGS. 2 and 3, and/or may be located within a cloud computing environment 400 such as that described above (in Section D) in connection with FIG. 4.

In some implementations, the CA 604 shown in FIG. 6A may correspond to, or operate in conjunction with, the access management server(s) 204a of the file sharing system 504 described above (in Section E) in connection with FIGS. 5A-C. As shown in FIG. 6A, the CA 604 may be in communication with the file sharing system 504. In some embodiments, the CA 604 may be part of/implemented in/included in the file sharing system 504. The CA 604 may be configured to validate the client device(s) 202 for the file sharing system 504, to sign certificates for the client device(s) 202, and to store a public key for the client device(s) 202 as described in relation to FIGS. 6B, 7A and 7B.

Figure 6B:
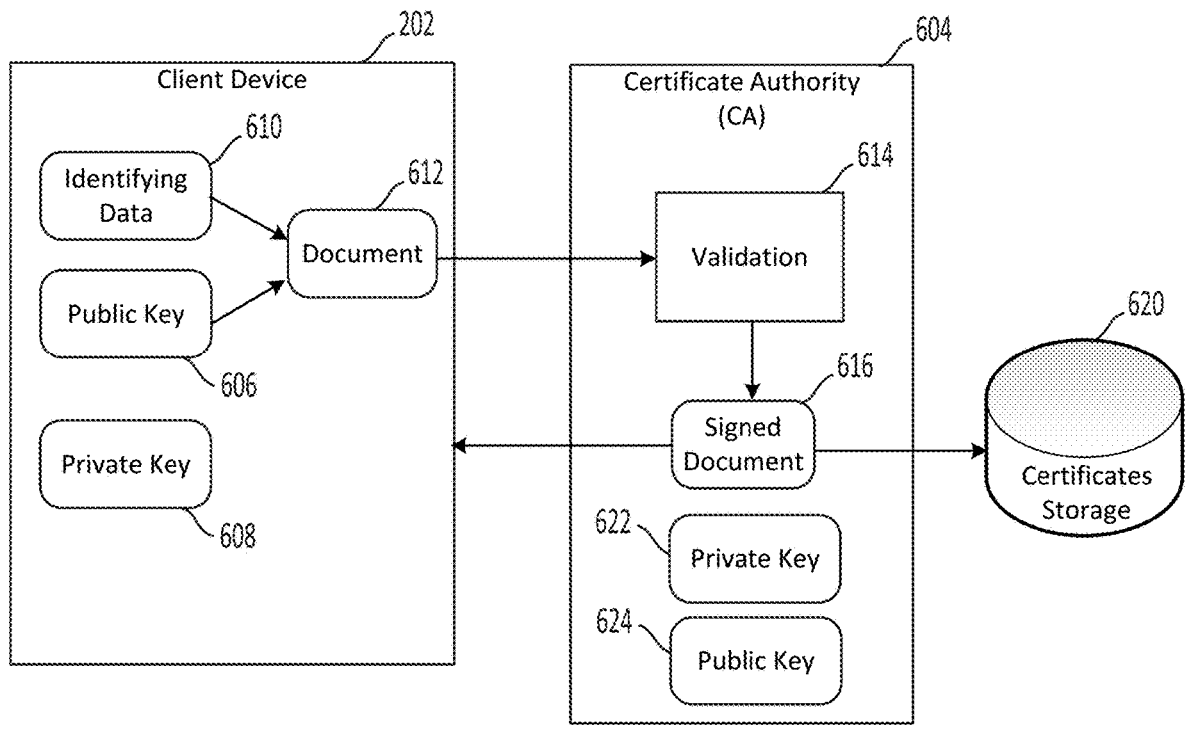
FIG. 6B is a diagram illustrating certain operations that may be performed by a client device and the certificate authority of FIG. 6A in accordance with some embodiments.

FIG. 6B shows example components of the CA 604 and example data that may be used to certify or otherwise identify the client device 202 using the CA 604 in accordance with some embodiments. The client device 202 may request to be authorized for the file sharing system 504, and as part of that request the client device 202 may request a certificate that is signed by the CA 604. The client device 202 may perform a routine 700 of FIG. 7A to be certified by the CA 604 for the file sharing system 504 in accordance with some embodiments. The CA 604 may perform a routine 720 of FIG. 7B to certify the client device 202 for the file sharing system 504 in accordance with some embodiments.

In some embodiments, the CA 604 may be configured to validate the identities of entities (such as devices, websites, email addresses, companies, or individual persons) and bind them to cryptographic keys through the issuance of electronic documents (e.g., digital certificates or identification certificates) a document 616 described below. The document 616 may be used to authenticate the client device 202 (or other entities) by serving as a credential to validate the identity of the client device 202 that it is issued to. The document 616 may also be used to encrypt data for secure communication of data over the Internet. The document 616 may also be used to validate the integrity of documents/data signed with the document 616 to determine that the documents/data were not altered by a third party during transmission.

Figure 7A:
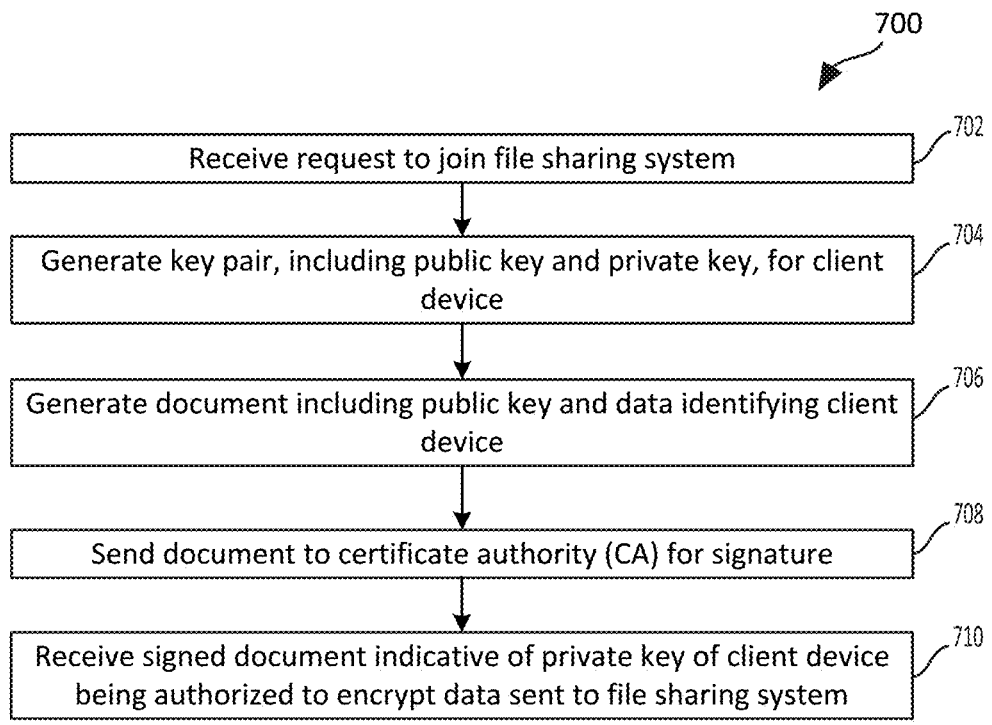
FIG. 7A shows an example routine that may be performed by the client device to be certified by the certificate authority in accordance with some embodiments.

Referring to FIGS. 6B and 7A, the client device 202, at a step 702, may receive a request to join the file sharing system 504. For example, the user 104 or 108 may provide an input (e.g., selection of a button or other types of inputs) indicating the user 104, 108 wants to be authorized to use the file sharing system 504 for sharing files with other users of the file sharing system 504. In response to receiving the request at the step 702, the client device 202 may generate a key pair for the client device 202, where the key pair includes a public key 606 and a private key 608. The private key 608 may be stored at the client device 202 and may not be communicated to, shown to, or otherwise revealed to another device, server, or system. As described below, the private key 608 may be used by the client device 202 to encrypt data being sent to the file sharing system 504. Public key cryptography allows a first device/system to encrypt data using its private key (which is not shared) and to send its public key via an open, unsecure communications channel to other devices/systems. Having the public key enables the recipient devices/systems to decrypt the data that was encrypted using the private key.

At a step 706, the client device 202 may generate a document 612 (e.g., a digital certificate or identification certificate) including the public key 606 and identifying data 610 for the client device 202. The document 612, in some embodiments, may be an encoded text file that includes the public key 606 and the identifying data 610. The identifying data 610 may include, in some embodiments, a name of the client device 202 (e.g., a name used to uniquely identify the client device 202 within an organization). In some embodiments, the identifying data 610 may also include a name of the organization the client device 202 belongs to (e.g., company/employer name), a location of the client device 202 (e.g., a geographic location, an office location, a primary location the client device 202 is typically used at, etc.), a device type of the client device 202 (e.g., laptop, tablet, desktop, etc.), a domain name of the client device 202, an email address of the user of the client device 202, and/or other data identifying the client device 202. The information included in the identifying data 610 may depend on a level of validation required by the file sharing system 504 and an intended use of the certificate. At a step 708, the client device 202 may send a certificate signing request (CSR) and send the document 612 to the CA 604 for signing.

Figure 7B:
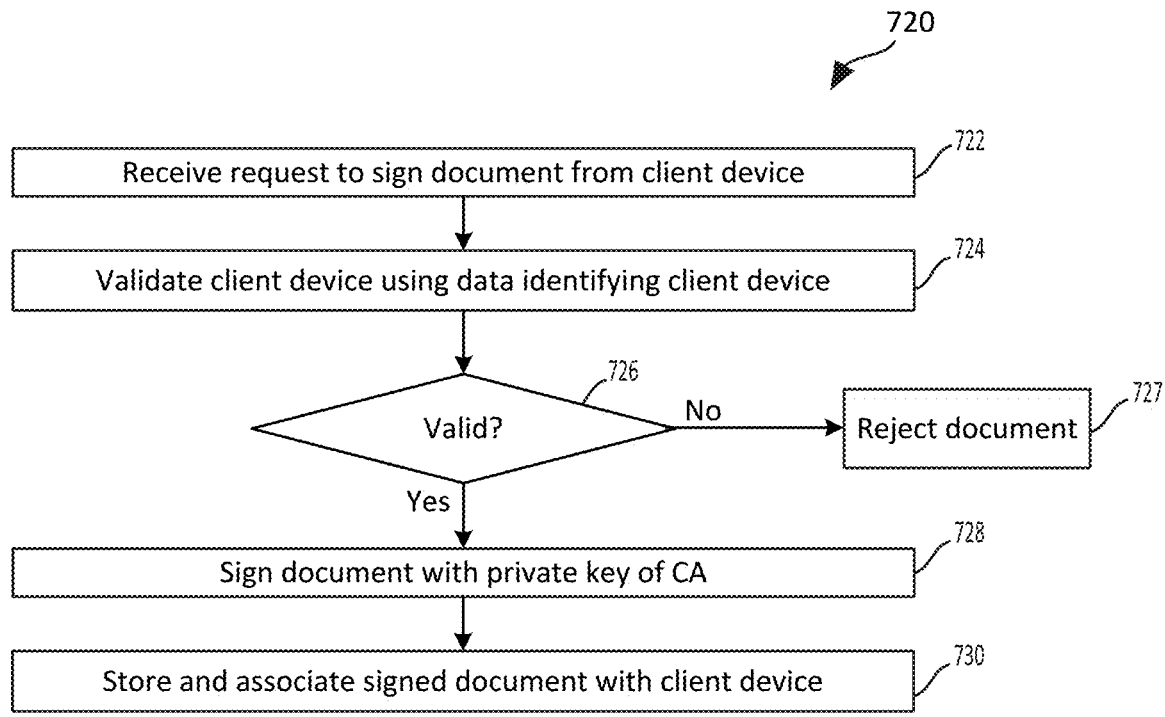
FIG. 7B shows an example routine that may be performed by the certificate authority to certify the client device in accordance with some embodiments.

Referring now to FIGS. 6B and 7B, the CA 604 may receive, at a step 722, a request to sign the document 612 from the client device 202. The CA 604 may include a validation component 614, in some embodiments, which is configured to validate, at a step 724, the client device 202 using the identifying data 610 included in the document 612. In validating the client device 202, the CA 604 may validate the identity of the client device 202 using the identifying data 610. In some implementations, the identifying data 610 may include an email address and a name of the user of the client device 202, and the CA 604 may perform a lookup on the email domain to verify that the email address belongs to the named user. The CA 604 may additionally or alternatively, send an email to the email address requesting confirmation that the user, seeking signature on the document 612, controls the email address. In other implementations, the identifying data 610 may include an identifier for the client device 202, and a name of an organization that the user of the client device 202 is associated with or the client device 202 is registered to, and the CA 604 may perform a lookup using the client device 202 identifier and data for the organization specifying which client devices are authorized for or associated with the organization. In other implementations, the identifying data 610 may include various information, such as, a name of the user of the client device 202, an identifier for the client device 202, and other information, and the CA 604 may send a request, including the identifying data 610, to an administrator device (not shown in FIG. 6B) to confirm that the identified user/client device 202 is authorized for or associated with the administrator's organization and should be issued a signed document.

At a decision step 726, the CA 604 may determine if the client device 202 is valid using one or more techniques/guidelines, such as ones described above (e.g., performing a lookup of the email address and user name, sending a confirmation email to the email address, obtaining verification from an administrator, etc.). If the client device 202 is invalid, based on the CA 604 not being able to verify the identity of the client device 202 using the identifying data 610, or the CA 604 determining the client device 202 to be a malicious entity, then the CA 604, at a step 727, may reject the document 612 and not sign the document 612. In some embodiments, the CA 604 may add the client device 202 to a restricted list, which may indicate to the CA 604 and/or the file sharing system 504 to block/reject communications, including transmission of data, from the client device 202. In some embodiments, the client device 202 may be on the restricted list for a period of time, and the client device 202 may be able to send another document 612 to the CA 604 for signature at a later time and/or with updated/corrected identifying data 610. In some embodiments, an administrator may approve the CA 604 to certify the client device 202 based on the client device 202 being erroneously determined to be invalid. If the client device 202 is determined to be valid at the step 726, then at a step 728 the CA 604 may digitally sign the document 612 using a private key 622 of the CA 604 and generate a signed document 616. The signed document 616 may include, in some embodiments, the public key 606 of the client device 202, the identifying data 610 of the client device 202, and a signature of the CA 604. At a step 730, the CA 604 may store the signed document 616 for the client device 202. The signed document 616 may be stored in a certificates storage 620.

The CA 604 may send the signed document 616 to the client device 202. Referring again to FIG. 7A, the client device 202 may receive the signed document 616, which may indicate to the client device 202 that the client device 202 is authorized to encrypt data, using the private key 608, being sent to the file sharing system 504. In some embodiments, the client device 202 may store the signed document 616. When the signed document 616 is presented to a third party, such as the file sharing system 504 or another client device 202, the recipient may cryptographically confirm the CA's digital signature using the CA's public key 624. Additionally, the recipient may use the signed document 616 to confirm that signed/encrypted data was sent by a client device 202 in possession of the corresponding private key 608, and that the data has not been altered since it was signed/encrypted.

Figure 8A:
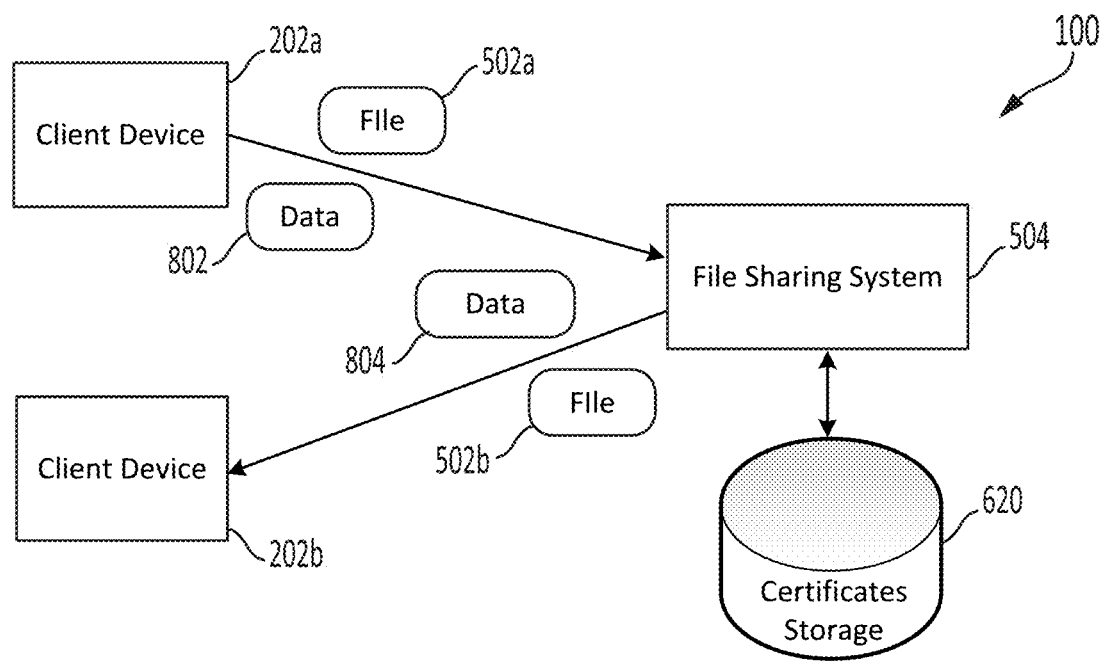
FIG. 8A is a diagram illustrating certain operations that may be performed by client devices and the file sharing system in accordance with some embodiments.
Figure 8B:
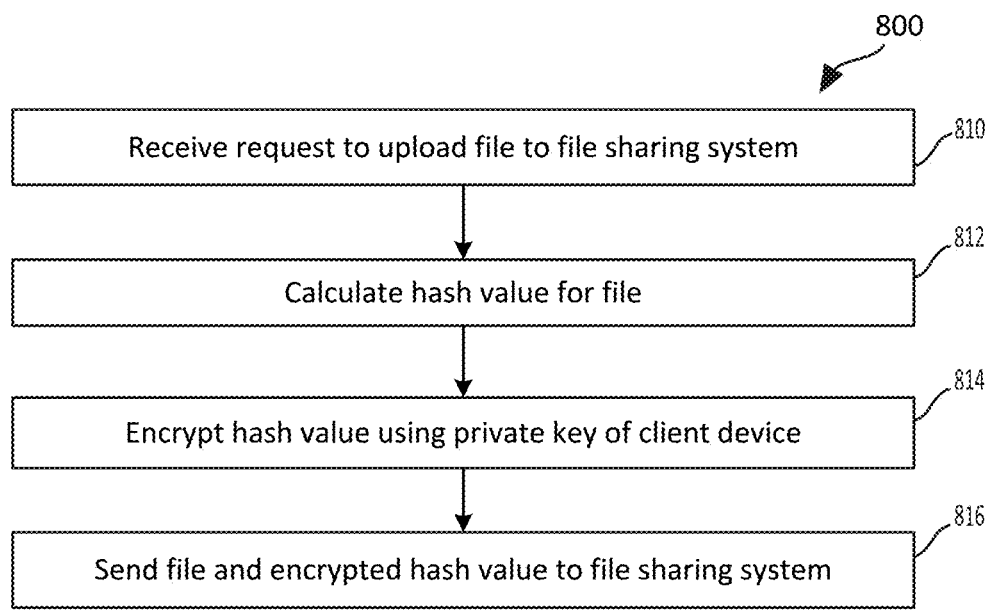
FIG. 8B shows an example routine that may be performed by the client device to upload a file to the file sharing system in accordance with some embodiments.

FIG. 8A shows the client device 202a sending a file 502a and data 802 to the file sharing system 504 during an upload operation. FIG. 8A further shows the file sharing system 504 sending a file 502b and data (e.g., metadata) 804 to the client device 202b. FIG. 8B shows an example routine 800 that may be performed by the client device 202a (also shown in FIG. 1A) in response to a request to upload the file 502a to the file sharing system 504. In performing the routine 800, the client device 202a, at a high level, may automatically generate an encrypted value (e.g., a hash value) representative of the file to be uploaded, and may send the file and the encrypted value to the file sharing system 504 (implemented at a remote computing system).

At a step 810, the client device 202a may receive a request to upload the 502a file to the file sharing system 504. In some implementations, the request may be received via a file sharing application (such as the file management application 513 described in Section E) installed at the client device 202a. For example, the user 104 may select/click an "upload" button indicating the user 104 wants to upload the file 502a, and then the user 104 may select at least one file to be uploaded. The user 104 may select the file 502a from the files available at the client device 202a, for example, stored in a memory of the client device 202a or stored in an external memory of the client device 202a. The user 104 may select the file 502a from the files available at the client device 202a via a virtual storage, for example, files stored in the cloud that the user 104 has access to, files stored in a user-specific repository of the file sharing system 504 that the user 104 has access to, etc.

In response to receiving the request to upload the file 502a, the client device 202a, at a step 812, may calculate a value (e.g., a hash value) for the file to be uploaded. In some implementations, the value may be calculated by the file sharing application installed at the client device 202a. The value may be calculated using the contents of the file to be uploaded. The client device 202a may use hashing techniques to calculate the value, such as Secure Hash Algorithm (SHA)-1, SHA-2, SHA-0, SHA-256, Message Digest Algorithm 5 (MD5), etc.

At a step 814, the client device 202a may encrypt the value using the private key 608 of the client device 202a. In some implementations, the value (calculated in the step 812) may be encrypted by the file sharing application installed at the client device 202a. In some implementations, the client device 202a may alternatively or additionally sign the hash value using the private key 608 of the client device 202a, so that the file sharing system 504 or another client device 202b can determine that the hash value was calculated and/or transmitted by the client device 202a.

At a step 816, the client device 202a may send the file 502 and data 802 including the encrypted value (e.g. a hash value) to the file sharing system 504. The file and the data 802 may be sent to the file sharing system 504 via the network(s) 112, 206 described in relation to FIGS. 1A, 1B, 1C, and 5A. The file and the encrypted value may be sent by the file sharing application installed at the client device 202a.

Although the description of FIG. 8B discusses uploading a file to the file sharing system 504, it should be understood that similar steps may be performed by the client device 202 in response to a request to upload/send a file, via one or more networks, to any other system or any other device. As used herein, the term "files" refers to documents, audio files, video files, images, executable files, and/or other types of files.

In some cases, the client device 202a may receive a request to upload more than one file. In some embodiments, the client device 202a may calculate separate values (per the step 812) for the respective files that are to be uploaded, and may encrypt such separate values using the private key 608. The separate values may be calculated by the client device 202a in parallel. In other embodiments, the client device 202a may calculate separate values (per the step 812) for the respective files that are to be uploaded, and may encrypt all the values and/or sign all the values, as one package, using the private key 608.

Figure 9:
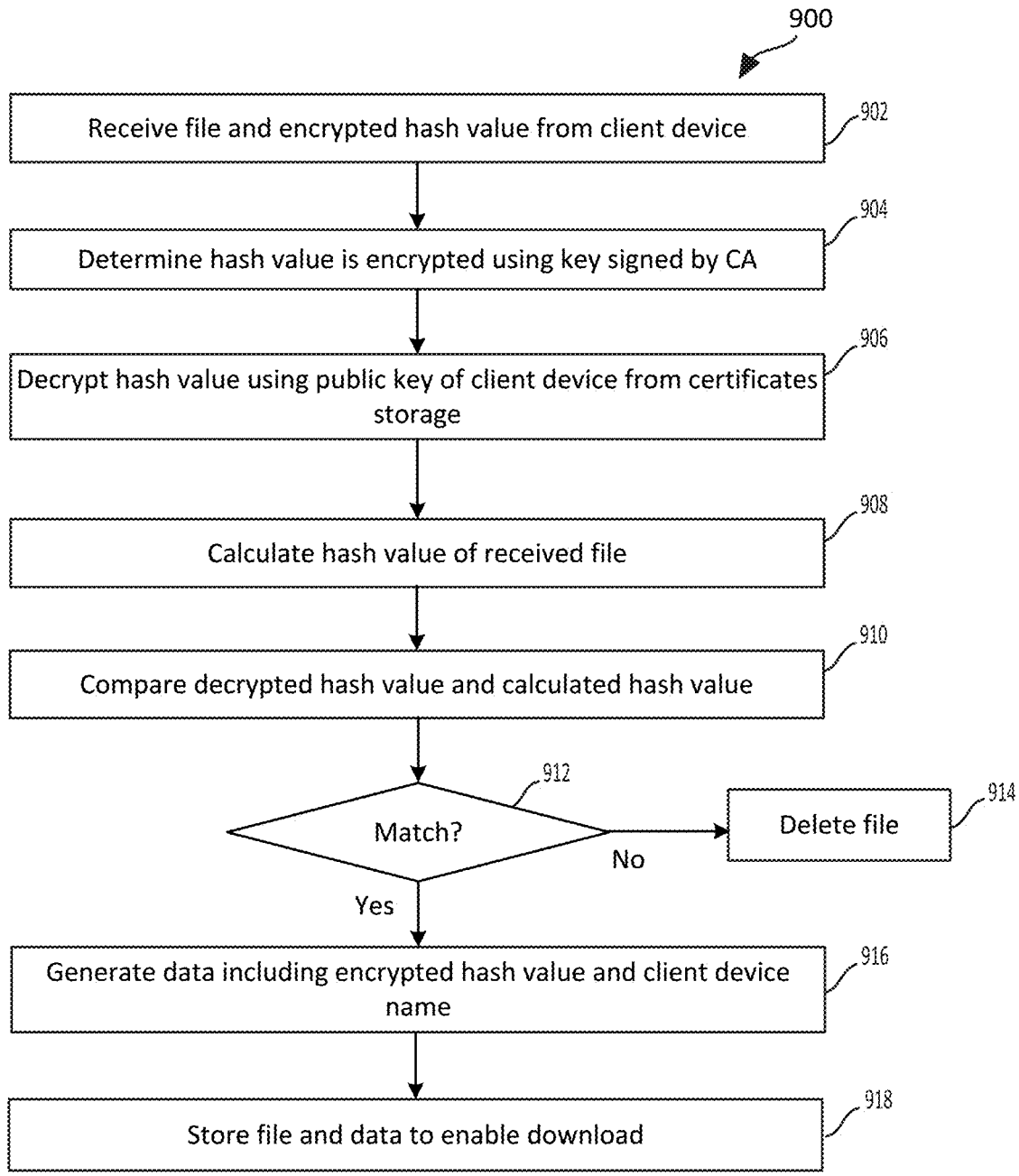
FIG. 9 shows an example routine that may be performed by the file sharing system to validate a file for upload in accordance with some embodiments.

FIG. 9 shows an example routine 900 that may be performed by the file sharing system 504 to validate the file to be uploaded. At a high level, in performing the routine 900, the file sharing system 504 may decrypt the value (e.g., a hash representation) and compare it to another value (e.g., a hash representation) of the received file to detect tampering. A value is mapped from the contents of a file generated by for example a cryptographic hashing techniques. Any change in the contents of the file, even in a single bit, will result in a different value. Therefore, any tampering or manipulation of the file can be detected by comparing values.

At a step 902, the file sharing system 504 may receive the file 502a and the data 802 including the encrypted value from the client device 202a. The file 502a and the data 802 may be sent by the client device 202a per the step 816 of FIG. 8B. In some embodiments, the data 802 may also include a name of the client device 202a or other information identifying the client device 202a, so that the file sharing system 504 may identify which client device 202 is sending the file for upload.

At a step 904, the file sharing system 504 may determine that the value (e.g., a hash value) in the data 802 (received at the step 902) is encrypted using a public key signed by the CA 604. In other words, the file sharing system 504 may determine that the value is encrypted (or signed) by a client device that has been certified, by the CA 604, to send encrypted data to the file sharing system 504 (as described in relation to FIG. 7B). In some embodiments, the file sharing system 504 may determine that information (including the public key 606) for the client device 202a is stored in the certificates storage 620. In some embodiments, the file sharing system 504 may determine that the public key 606 used to encrypt and/or sign the value was signed using the public key 624 of the CA 604. For example, the signed document 616 may include an identifier (e.g., a name, a serial number, etc.) for the CA 604, indicating to the file sharing system 504 that the public key 606 was signed by the CA 604. In another example, the signed document 616 may include a document (e.g., a digital certificate or identification certificate) for the CA 604, indicating to the file sharing system 504 that the public key 606 was signed by the CA 604.

At a step 906, the file sharing system 504 may decrypt the value (e.g., a hash value) in the data 802 (received at the step 902) using the public key 606 of the client device 202a. The file sharing system 504 may retrieve the public key 606 from the certificates storage 620. In some embodiments, the client device 202a may send the public key 606 to the file sharing system 504, for example, via the networks 112, 206.

At a step 908, the file sharing system 504 may calculate a value (e.g., a hash value) of the file 502a received at the step 902. The file sharing system 504 may use the same techniques used by the file sharing application at the client device 202a to calculate the value for the file 502a to be uploaded. The techniques, in some embodiments, may be selected such that the file sharing system 504 and any file sharing applications installed at client devices 202 use the same technique.

At a step 910, the file sharing system 504 may compare the decrypted value (from the step 906) and the calculated value (from the step 908). As described above, if any changes have been made to the file, the value will be different, thus, indicating tampering with the file 502a received at the file sharing system 504. The decrypted value represents the value calculated by the client device 202a, and it can be assumed that the decrypted value is not tampered with since it was encrypted using the private key 608 of the client device 202a. The calculated value represents the value determined by the file sharing system 504 using the file 502a received at the file sharing system 504.

Thus by comparing these two values, the file sharing system 504 can detect tampering with the file 502*a* received at the file sharing system 504.

At a decision step 912, the file sharing system 504 may determine whether or not the decrypted value and the calculated value are a match. If the foregoing values are not a match, then at a step 914 the file sharing system 504 may delete the file 502*a* (received at the step 902). The file sharing system 504 may determine that the received file 502*a* was tampered with (altered, replaced, etc.) and may include malicious content, and thus may delete the received file 502*a*. In some embodiments, the file sharing system 504 may also cause the client device 202*a* (via the file sharing application at the client device 202*a*) to output a message, a pop-up or other indication, via a display or other peripherals of the client device 202*a*, that the file was not uploaded to the file sharing system 504.

At the decision step 912, if the file sharing system 504 determines that the foregoing values are a match, then at a step 916, the file sharing system 504 may generate data including the encrypted value (received at the step 902) and a name of the client device 202*a*. In some embodiments, the data may include a public key 624 of the CA 604 indicating that the data has been signed by the CA 604. In some embodiments, the file sharing system 504 may encrypt the value for the received file calculated by the file sharing system 504 in the step 908. In some embodiments, the file sharing system 504 may encrypt the value using the private key 622 of the CA 604. In some embodiments, the file sharing system 504 may sign the value using the private key 622 of the CA 604.

In some embodiments, the data may include a document (e.g., a digital certificate or identification certificate) of the client device 202*a* or a document (e.g., a digital certificate or identification certificate) of the CA 604. In some embodiments, a document, in addition to containing a public key, may also contain additional information such as an identifier of the issuer of the public key, what the document is to be used for, and/or other information. Generally, a document may be signed by the CA 604 using CA's private key 622. This signature verifies the authenticity of the document. A document (e.g., a digital certificate or identification certificate) may verify that an entity (e.g., the client device 202, the CA 604, etc.) is the owner of a particular public key.

At a step 918, the file sharing system 504 may store the file 502*a* (received at the step 902) and the data 804 (generated at the step 916) to enable download of the file 502*a* by another client device 202*b*. The data 804 may be associated with the file 502*a*, and may be stored in the storage 512 of the file sharing system 504 (shown in FIGS. 5A and 5C). Storing of the file 502*a* and the data 804 in the storage 512 may enable other client devices 202 to download the file 502*a* from the file sharing system 504.

In this manner, according to the routine 900, the file sharing system 504 may validate that the file 502*a* received at the file sharing system 504 is the file 502*a* that the user 104 intended to upload to the file sharing system 504, and that the file 502*a* received at the file sharing system 504 was not tampered with or replaced in transit from the client device 202*a* to the file sharing system 504.

Although the description of FIG. 9 discusses validating a file by the file sharing system 504, it should be understood that similar steps may be performed any other system or any other device (associated with or including its own certificate authority) to validate a file received at the system/device, and to make the received file available to other systems/devices for download/access.

Figure 10:
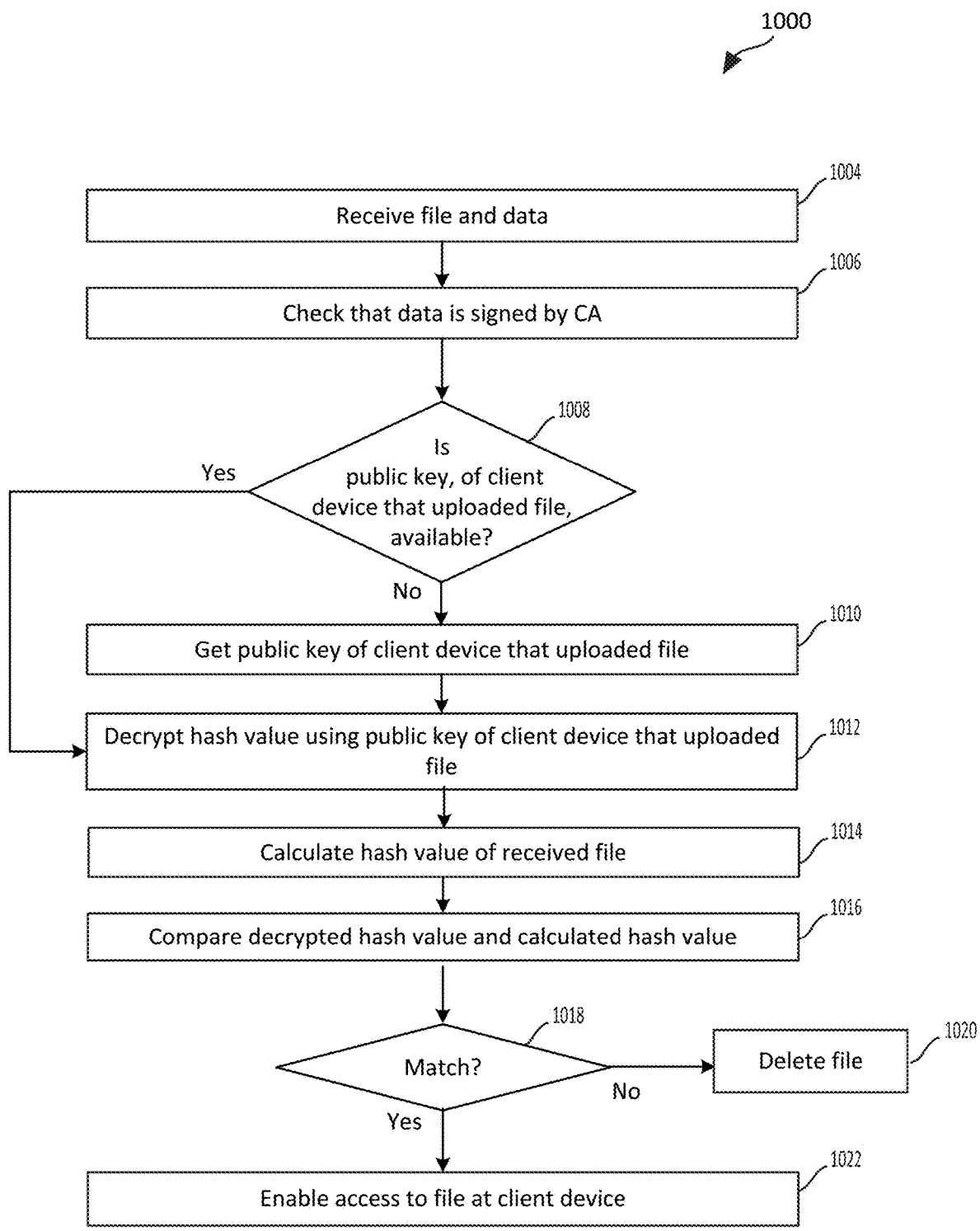
FIG. 10 shows an example routine that may be performed by the client device to validate a file for download in accordance with some embodiments.

FIG. 10 shows an example routine 1000 that may be performed by the client device 202 (e.g., the client device 202*b* shown in FIG. 1C) to validate a file 502*b* to be downloaded at the client device. At a high level, in performing the routine 1000, the client device 202*b* may validate that data (e.g., metadata) 804 is signed by the CA 604, and that the encrypted value (e.g., a hash value) included in the data matches the value of the file 502*b* received at the client device 202*b*.

In some embodiments, the client device 202*b* may receive a request to download a file 502*b* from the file sharing system 504. In some implementations, the request may be received via a file sharing application installed at the client device 202*b*. For example, the user 108 may select/click a "download" button indicating the user 108 wants to download the indicated file 502*b*. The user 108 may select the file 502*b* for download from the files available to the user 108 and/or client device 202*b* for download from the file sharing system 504.

In some embodiments, the client device 202*b* may be set to automatically synchronize one or more files available at the file sharing system 504. Using the file sharing application installed at the client device 202*b*, the user 108 may set the file 502*b* to be downloaded (e.g., automatically downloaded) when the file 502*b* is available at the file sharing system 504. In some embodiments, a user other than the user 108 (e.g., the user 104, an administrator, a manager, etc.) may indicate to the file sharing system 504 that the file 502*b* is to be downloaded at the client device 202*b* when it is available at the file sharing system 504. In some embodiments, the file 502*b* may be downloaded at the client device 202*b* when the client device 202*b* first joins the file sharing system 504 (e.g., upon initial login to the file sharing system 504).

In response to the request to download the file at the client device 202*b* or in response to automatically synchronizing the file at the client device 202*b*, at a step 1004, the client device 202*b* may receive the file 502*b* and the data 804 from the file sharing system 504. The file 502*b* may be the file 502*a* previously uploaded by the user 104 via the client device 202*a*. The data (e.g., metadata) 804 may be the data 804 generated in the step 916 shown in FIG. 9, and may include a value (e.g., an encrypted hash value) for the file. In response to receiving the file 502*b* and the data 804 from the file sharing system 504, the client device 202*b* may automatically perform the following steps to validate the received file 502*b* is the file intended to be downloaded to the client device 202*b*.

At a step 1006, the client device 202*b* may check that the data 804 (received at the step 1004) is signed by the CA 604. The client device 202*b* may perform this check using the file sharing application installed at the client device 202*b*. In some embodiments, the client device 202*b* may determine whether the data 804 includes a document (e.g., a digital certificate or identification certificate) of the CA 604 and/or an identifier for the CA 604. The client device 202*b* may store the document of the CA 604 and/or the identifier for the CA 604, and the client device 202*b* may perform a lookup to determine whether the data 804 includes the document of the CA 604 and/or the identifier for the CA 604. In some embodiments, the client device 202*b* may determine whether the data 804 was signed using the public key 624 of the CA 604. In some embodiments, the client device 202*b* may determine whether a document (e.g., a digital certificate or identification certificate) of the client device 202*a* included in the data 804 was issued/signed by the CA 604. For example, the signed document 616 for the client device 202a may include an identifier (e.g., a name, a serial number, etc.) for the CA 604 and/or a document (e.g., a digital certificate or identification certificate) for the CA 604, the client device 202b may store the identifier and/or the document for the CA 604, and the client device 202b may perform a lookup to determine that the document 616 for the client device 202a is signed by the CA 604. If the data is not signed by the CA 604, then the client device 202b may delete the received data 804 and the received file 502b, or the client device 202b may take no action with respect to the received file. By checking that the data is signed by the CA 604, the client device 202b may ensure that the data included in the data 804 (e.g., encrypted hash value, certificates, etc.) was sent by the file sharing system 504 and by a malicious entity (in a MITM attack).

After determining that the data 804 is signed by the CA 604, the client device 202b may determine, at a decision step 1008, whether the public key 606 of the client device 202a is available at the client device 202b. In some embodiments, the client device 202b may already have the public key 606 (e.g., in storage/memory of the client device 202b) because the client device 202b may have previously received a file uploaded by the client device 202a, which was validated by the client device 202b using the public key 606. In some embodiments, the client device 202b may determine the name of the client device 202a included in the data 804, and query a storage of the client device 202b to determine whether the public key 606 for the client device 202a is available. If the public key 606 is available, then the client device 202b may perform a step 1012.

If the public key 606 of the client device 202b is not available at the client device 202b, then at a step 1010 the client device 202b may get the public key 606 of the client device 202a that uploaded the file 502a to be downloaded at the client device 202b. In some embodiments, the client device 202b may request the file sharing system 504 and/or the CA 604 to provide the public key 606 of the client device 202a. The request may include the name of the client device 202a included in the data 804. In some embodiments, the client device 202b may send a request to the client device 202a to provide the public key 606. In response to the request, the client device 202b may receive the public key 606 of the client device 202a.

At a step 1012, the client device 202b may decrypt the value (included in the data 804 received at the step 1004) using the public key 606 of the client device 202a that uploaded the file 502a to the file sharing system 504. In some embodiments, the value may be decrypted by the file sharing application installed at the client device 202b.

At a step 1014, the client device 202b may calculate a value for the file 502b received at step 1004. The client device 202b may calculate the value using the same techniques used by the client device 202a and the file sharing system 504. In some embodiments, the value may be calculated by the file sharing application installed at the client device 202b.

At a step 1016, the client device 202b may compare the decrypted value (from the step 1012) and the calculated value (from the step 1014). As described above, if any changes have been made to the file received by the client device 202b, then the value will be different, thus, indicating tampering with the file 502b received by the client device 202b. The decrypted value represents the value calculated by the client device 202a (or the file sharing system 504), and it can be assumed that the decrypted value is not tampered with since it was encrypted using the private key 608 of the client device 202a (or the private key 622 of the CA 604).

The calculated value represents the value determined by the client device 202b using the file 502b received at the client device 202b. Thus by comparing these two values, the client device 202b can detect tampering with the file 502b received at the client device 202b.

At a decision step 1018, the client device 202b may determine whether or not the decrypted value and the calculated value are a match. If the foregoing values are not a match, then at a step 1020 the client device 202b may delete the file 502b (received at the step 1004) or otherwise deny access to the file 502b at the client device 202b. The client device 202b may determine that the received file 502b was tampered with (altered, replaced, etc.) and may include malicious content, and may thus delete the received file. In some embodiments, the client device 202b (via the file sharing application at the client device 202b) may output a message, a pop-up or other indication, via a display or other peripherals of the client device 202b, that the file was not downloaded.

At the decision step 1018, if the client device 202b determines that the foregoing values are a match, then at a step 1022, the client device 202b may enable access to the file 502b (received at the step 1004) at the client device 202b. The client device 202b may store the received file 502b in a storage/memory of the client device 202b. The client device 202b may enable the user 108 to open the file 502b at the client device 202b.

In this manner, according to the routine 1000, the client device 202b may validate that the file 502b received at the client device 202b is the file that the user 108 intended to download from the file sharing system 504, and that the file 502b received at the client device 202b was not tampered with or replaced in transit from the file sharing system 504 to the client device 202b.

Although the description of FIG. 10 discusses validating a file received from the file sharing system 504, it should be understood that similar steps may be performed by the client device 202b to validate a file received from any other system or any other device.

G. Example Implementations of Methods, Systems, and Computer-Readable Media in Accordance with the Present Disclosure The following paragraphs (M1) through (M20) describe examples of methods that may be implemented in accordance with the present disclosure.

(M1) A method may involve a first client device receiving a file and data, where the file was previously uploaded by a second client device to a remote computing system and the data includes a first value encrypted based on a certificate of the second client device, determining validity of the certificate of the second client device based on another certificate of the remote computing system, decrypting the first value with use of a key of the certificate of the second client device in response to validation of the certificate, determining a second value for the received file, and determining validity of the received file based on a match of the first value and the second value.

(M2) A method may be performed as described in paragraph (M1), wherein the first value may be a hash value based on contents of the file previously uploaded by the second client device, and wherein the second value may be a hash value based on contents of the file received by the first client device.

(M3) A method may be performed as described in paragraph (M1) or paragraph (M2), wherein the data may further include a certificate of a certificate authority (CA) of the remote computing system, and wherein determining the validity of the certificate of the second client device may include determining that the certificate has been signed by the CA.

(M4) A method may be performed as described in any of paragraphs (M1) through (M3), and wherein the data may further include an identifier of the second client device, and the method may further involve determining, using the identifier, that the key of the certificate of the second client device is available at the first client device, and using the available key to decrypt the first value.

(M5) A method may be performed as described in any of paragraphs (M1) through (M4), wherein the data may further include an identifier of the second client device, and the method may further involve determining, using the identifier, that the key of the certificate of the second client device is not available at the first client device, sending, to the remote computing system, a request for the key of the certificate of the second client device, receiving, from the remote computing system, the key of the certificate of the second client device, and using the received key to decrypt the first value.

(M6) A method may be performed as described in any of paragraphs (M1) through (M5), and may further involve receiving input data representing a request to download the file, wherein receiving the file and the data is in response to receiving the input data.

(M7) A method may be performed as described in any of paragraphs (M1) through (M6), and may further involve determining that the first client device is to download the file in response to uploading of the file to the remote computing system, wherein receiving the file and the data is in response to detecting that the file is uploaded to the remote computing system.

(M8) A method may be performed as described in any of paragraphs (M1) through (M7), and may further involve receiving an additional file and additional data, where the additional file having been previously uploaded by the second client device to the remote computing system and the additional data including a third value encrypted based on the certificate of the second client device, determining validity of the certificate of the second client device based on the certificate of the remote computing system, decrypting the third value with use of the key of the certificate of the second client device in response to validation of the certificate, determining a fourth value for the received additional file, determining that the received additional file is invalid based on a mismatch of the third value and the fourth value, and deleting or denying access to the received additional file at the first client device.

(M9) A method may be performed as described in any of paragraphs (M1) through (M8), wherein the data may further include a certificate for the remote computing system and an identifier of the second client device.

(M10) A method may involve a first client device receiving a file and data, where the file was previously uploaded by a second client device to a remote computing system and the data includes a first value encrypted based on a certificate of the second client device, determining validity of the certificate of the second client device based on another certificate of the remote computing system, decrypting the first value with use of a key of the certificate of the second client device in response to validation of the certificate, determining a second value for the received file, and determining validity of the received file based on a match of the first value and the second value.

(M11) A method may be performed as described in paragraph (M10), and may further involve the second client device receiving a request to upload the file to the remote computing system, generating a hash value based on contents of the file to be uploaded, in response to the request to upload the file, encrypting the hash value using a private key of the second client device, and sending, to the remote computing system, the encrypted hash value and the file to be uploaded.

(M12) A method may be performed as described in paragraph (M11), and may further involve the remote computing system receiving the file to be uploaded and the encrypted hash value, generating a second hash value based on contents of the received file, decrypting the encrypted hash value using a public key of the second client device to determine a decrypted hash value, determining validity of the received file based on a match of the second hash value and the encrypted hash value, based at least in part on the second hash value matching the decrypted hash value, generating the data to include at least the encrypted hash value, and storing the received file and the data so that the file is available for download by at least the first client device.

(M13) A method may be performed as described in any of paragraphs (M10) through (M12), and may further involve the second client device receiving a request to register for a file sharing using the remote computing system, and in response to the request to register for file sharing, initiating a certificate authorization process with a CA for the remote computing system by: generating a key pair including a private key and a public key for the second client device, generating a certificate including the public key and information identifying the second client device, sending the certificate to the CA for signature, and receiving a signed certificate from the CA, the signed certificate indicative of the private key being authorized to encrypt data sent by the second client device to the remote computing system.

(M14) A method may be performed as described in any of paragraphs (M10) through (M13), wherein the data may further include an identifier associated with the second client device, and the method may further involve the first client device determining, using the identifier, that the key of the certificate of the second client device is available at the first client device, and using the available key to decrypt the first value.

(M15) A method may be performed as described in any of paragraphs (M10) through (M14), wherein the data may further include an identifier for the second client device, and the method may further involve the first client device determining, using the identifier, that the key of the certificate of the second client device is not available at the first client device, sending, to the remote computing system, a request for the key of the certificate of the second client device, and using the received key to decrypt the first value.

(M16) A method may be performed as described in any paragraphs (M10) through (M15), and may further involve the first client device receiving input data representing a request to download the file, wherein the file and the data may be received in response to receiving the input data.

(M17) A method may be performed as described in any paragraphs (M10) through (M16), and may further involve the first client device determining that the first client device is to automatically download the file after upload of the file to the remote computing system, wherein the file and the data may be received in response to detecting that the file is uploaded to the remote computing system.

(M18) A method may involve a computing system receiving a file and a first value from a first client device, where the first value was encrypted based on contents of the file, decrypting the first value with use of a key of a certificate of the first client device, generating a second value for the file, determining a match of the first value and the second value, and generating data in response to the match of the first value and the second value, so as to enable download of the file by a second client device.

(M19) A method may be performed as described in paragraph (M18), wherein the data may further include a certificate authority (CA) signature of a certificate of the computing system, and an identifier of the first client device.

(M20) A method may be performed as described in paragraph (M18) or paragraph (M19), and may further involve receiving from a second client device, a request to register for file sharing using the computing system, receiving, at a CA of the computing system, a certificate including a public key of the first client device and information identifying the first client device, validating, by the CA and using the certificate, an identity of the first client device, signing, by the CA, the certificate with a key of the CA, and sending, to the first client device, the signed certificate indicative of the first client device being authorized to encrypt data, using a private key corresponding to the public key of the first client device, sent to the computing system.

The following paragraphs (S1) through (S20) describe examples of systems and devices that may be implemented in accordance with the present disclosure.

(S1) A first client device may comprise at least one processor and at least one computer-readable medium encoded with instructions which, when executed by the at least one processor, cause the first client device to receive a file and data, where the file was previously uploaded by a second client device to a remote computing system and the data include a first value encrypted based on a certificate of the second client device, to determine validity of the certificate of the second client device based on another certificate of the remote computing system, to decrypt the first value with use of a key of the certificate of the second client device in response to validation of the certificate, to determine a second value for the received file, and to determine validity of the received file based on a match of the first value and the second value.

(S2) A first client device may be configured as described in paragraph (S1), wherein the first value may be a hash value based on contents of the file previously uploaded by the second client device, and wherein the second value may be a hash value based on contents of the file received by the first client device.

(S3) A first client device may be configured as described in paragraph (S1) or paragraph (S2), wherein the data may further include a certificate of a certificate authority (CA) of the remote computing system, and wherein determining the validity of the certificate of the second client device may include determining that the certificate has been signed by the CA.

(S4) A first client device may be configured as described in any of paragraphs (S1) through (S3), wherein the data may further include an identifier of the second client device, and the at least one computer-readable medium may be encoded with additional instruction which, when executed by the at least one processor, further cause the first client device to determine, using the identifier, that the key of the certificate of the second client device is available at the first client device, and to use the available key to decrypt the first value.

(S5) A first client device may be configured as described in any of paragraphs (S1) through (S4), wherein the data may further include an identifier of the second client device, and the at least one computer-readable medium may be encoded with additional instruction which, when executed by the at least one processor, further cause the first client device to determine, using the identifier, that the key of the certificate of the second client device is not available at the first client device, to send, to the remote computing system, a request for the key of the certificate of the second client device, to receive, from the remote computing system, the key of the certificate of the second client device, and to use the received key to decrypt the first value.

(S6) A first client device may be configured as described in any of paragraphs (S1) through (S5), wherein the at least one computer-readable medium may be encoded with additional instruction which, when executed by the at least one processor, further cause the first client device to receive input data representing a request to download the file, wherein receiving the file and the data may be performed in response to receiving the input data.

(S7) A first client device may be configured as described in any of paragraphs (S1) through (S6), wherein the at least one computer-readable medium may be encoded with additional instruction which, when executed by the at least one processor, further cause the first client device to determine that the first client device is to download the file in response to uploading of the file to the remote computing system, wherein receiving the file and the data may occur in response to detecting that the file is uploaded to the remote computing system.

(S8) A first client device may be configured as described in any of paragraphs (S1) through (S7), wherein the at least one computer-readable medium may be encoded with additional instruction which, when executed by the at least one processor, further cause the first client device to receive an additional file and additional data, where the additional file was previously uploaded by the second client device to the remote computing system and the additional data includes a third value encrypted based on the certificate of the second client device, to determine validity of the certificate of the second client device based on the certificate of the remote computing system, to decrypt the third value with use of the key of the certificate of the second client device in response to validation of the certificate, to determine a fourth value for the received additional file, to determine that the received additional file is invalid based on a mismatch of the third value and the fourth value, and to delete or deny access to the received additional file at the first client device.

(S9) A first client device may be configured as described in any of paragraphs (S1) through (S8), wherein the data may further include a certificate for the remote computing system and an identifier of the second client device.

(510) A system may comprise a first client device, a second client device and a remote computing system, where the first client device includes at least a first processor and at least a first computer-readable medium encoded with instructions which, when executed by the first processor, cause the first client device to receive a file and data, where the file was previously uploaded by a second client device to a remote computing system and the data includes a first value encrypted based on a certificate of the second client device, to determine validity of the certificate of the second client device based on another certificate of the remote computing system, to decrypt the first value with use of a key of the certificate of the second client device in response to validation of the certificate, to determine a second value for the received file, and to determine validity of the received file based on a match of the first value and the second value.

(S11) A system may be configured as described in paragraph (S10), wherein the second client device may include at least a second processor and at least a second computer-readable medium encoded with instructions which, when executed by the second processor, cause the second client device to receive a request to upload the file to the remote computing system, to generate a hash value based on contents of the file to be uploaded, to encrypt the hash value using a private key of the second client device in response to the request to upload the file, and to send, to the remote computing system, the encrypted hash value and the file to be uploaded.

(S12) A system may be configured as described in paragraph (S11), wherein the remote computing system may include at least a third processor and at least a third computer-readable medium encoded with instructions which, when executed by the third processor, cause the remote computing system to receive the file to be uploaded and the encrypted hash value, to generate a second hash value based on contents of the received file, to decrypt the encrypted hash value using a public key of the second client device to determine a decrypted hash value, to determine validity of the received file based on a match of the second hash value and the encrypted hash value, to generate the data to include at least the encrypted hash value based at least in part on the second hash value matching the decrypted hash value, and to store the received file and the data so that the file is available for download by at least the first client device.

(S13) A system may be configured as described in any of paragraphs (S10) through (S12), wherein the second computer-readable medium may be encoded with additional instructions which, when executed by the second processor, further cause the second client device to receive a request to register for a file sharing using the remote computing system, and in response to the request to register for file sharing, to initiate a certificate authorization process with a CA for the remote computing system at least in part by causing the second client device to generate a key pair including a private key and a public key for the second client device, to generate a certificate including the public key and information identifying the second client device, to send the certificate to the CA for signature, and to receive a signed certificate from the CA, the signed certificate indicative of the private key being authorized to encrypt data sent by the second client device to the remote computing system.

(S14) A system may be configured as described in any of paragraphs (S10) through (S13), wherein the data may further include an identifier associated with the second client device, and the at least first computer-readable medium may be encoded with additional instruction which, when executed by the at least first processor, further cause the first client device to determine, using the identifier, that the key of the certificate of the second client device is available at the first client device, and to use the available key to decrypt the first value.

(S15) A system may be configured as described in any of paragraphs (S10) through (S14), wherein the data may further include an identifier for the second client device, and the at least first computer-readable medium may be encoded with additional instruction which, when executed by the at least first processor, further cause the first client device to determine, using the identifier, that the key of the certificate of the second client device is not available at the first client device, to send, to the remote computing system, a request for the key of the certificate of the second client device, and to use the received key to decrypt the first value.

(S16) A system may be configured as described in any of paragraphs (S10) through (S15), wherein the first computer-readable medium may be encoded with additional instructions which, when executed by the first processor, further cause the first client device to receive input data representing a request to download the file, wherein the file and the data may be received in response to receiving the input data.

(S17) A system may be configured as described in any of paragraphs (S10) through (S16), wherein the first computer-readable medium may be encoded with additional instruction which, when executed by the first processor, further cause the first client device to determine that the first client device is to download the file in response to the file being uploaded to the remote computing system, wherein the file and the data may be received in response to detecting that the file has been uploaded to the remote computing system.

(S18) A computing system may comprise at least one processor and at least one computer-readable medium encoded with instructions which, when executed by the at least one processor, cause the computing system to receive a file and a first value from a first client device, where the first value was based on contents of the file, to decrypt the first value with use of a key of a certificate of the first client device, to generate a second value for the file, to determine a match of the first value and the second value, and to generate data in response to the match of the first value and the second value, so as to enable download of the file by a second client device.

(S19) A computing system may be configured as described in paragraph (S18), wherein the data may further include a certificate authority (CA) signature of a certificate of the computing system, and an identifier of the first client device.

(S20) A computing system may be configured as described in paragraph (S18) or paragraph (S19), wherein the at least one computer-readable medium may be encoded with additional instruction which, when executed by the at least one processor, further cause the computing system to receive from a second client device, a request to register for file sharing using the computing system, to receive, at a CA of the computing system, a certificate including a public key of the first client device and information identifying the first client device, to validate, by the CA and using the certificate, an identity of the first client device, to sign, by the CA, the certificate with a key of the CA, and to send, to the first client device, the signed certificate indicative of the first client device being authorized to encrypt data, using a private key corresponding to the public key of the first client device, sent to the computing system.

The following paragraphs (CRM1) through (CRM20) describe examples of computer-readable media that may be implemented in accordance with the present disclosure.

(CRM1) At least one non-transitory computer-readable medium may be encoded with instructions which, when executed by at least one processor of a first client device, cause the first client device to receive a file and data, where the file having was uploaded by a second client device to a remote computing system and the data includes a first value encrypted based on a certificate of the second client device, to determine validity of the certificate of the second client device based on another certificate of the remote computing system, to decrypt the first value with use of a key of the certificate of the second client device in response to validation of the certificate, to determine a second value for the received file, and to determine validity of the received file based on a match of the first value and the second value.

(CRM2) At least one non-transitory computer-readable medium may be configured as described in paragraph (CRM1), wherein the first value may be a hash value based on contents of the file previously uploaded by the second client device, and wherein the second value may be a hash value based on contents of the file received by the first client device.

(CRM3) At least one non-transitory computer-readable medium may be configured as described in paragraph (CRM1) or paragraph (CRM2), wherein the data may further include a certificate of a certificate authority (CA) of the remote computing system, and wherein determining the validity of the certificate of the second client device may include determining that the certificate has been signed by the CA.

(CRM4) At least one non-transitory computer-readable medium may be configured as described in any of paragraphs (CRM1) through (CRM3), wherein the data may further include an identifier of the second client device, and the at least one non-transitory computer-readable medium may be encoded with additional instruction which, when executed by the at least one processor, further cause the first client device to determine, using the identifier, that the key of the certificate of the second client device is available at the first client device, and to use the available key to decrypt the first value.

(CRM5) At least one non-transitory computer-readable medium may be configured as described in any of paragraphs (CRM1) through (CRM4), wherein the data may further include an identifier of the second client device, and the at least one non-transitory computer-readable medium may be encoded with additional instruction which, when executed by the at least one processor, further cause the first client device to determine, using the identifier, that the key of the certificate of the second client device is not available at the first client device, to send, to the remote computing system, a request for the key of the certificate of the second client device, to receive, from the remote computing system, the key of the certificate of the second client device, and to use the received key to decrypt the first value.

(CRM6) At least one non-transitory computer-readable medium may be configured as described in any of paragraphs (CRM1) through (CRM5), and may be encoded with additional instruction which, when executed by the at least one processor, further cause the first client device to receive input data representing a request to download the file, wherein receiving the file and the data may occur in response to receiving the input data.

(CRM7) At least one non-transitory computer-readable medium may be configured as described in any of paragraphs (CRM1) through (CRM6), may be encoded with additional instruction which, when executed by the at least one processor, further cause the first client device to determine that the first client device is to download the file in response to uploading of the file to the remote computing system, wherein receiving the file and the data may occur in response to detecting that the file has been uploaded to the remote computing system.

(CRM8) At least one non-transitory computer-readable medium may be configured as described in any of paragraphs (CRM1) through (CRM7), and may be encoded with additional instruction which, when executed by the at least one processor, further cause the first client device to receive an additional file and additional data, where the additional file was previously uploaded by the second client device to the remote computing system and the additional data includes a third value encrypted based on the certificate of the second client device, to determine validity of the certificate of the second client device based on the certificate of the remote computing system, to decrypt the third value with use of the key of the certificate of the second client device in response to validation of the certificate, to determine a fourth value for the received additional file, to determine that the received additional file is invalid based on a mismatch of the third value and the fourth value, and to delete or deny access to the received additional file at the first client device.

(CRM9) At least one non-transitory computer-readable medium may be configured as described in any of paragraphs (CRM1) through (CRM8), wherein the data may further include a certificate for the remote computing system and an identifier of the second client device.

(CRM10) At least one non-transitory computer-readable medium may be encoded with instructions which, when executed by at least one processor of a first client device, cause the first client device to receive a file and data, where the file was previously uploaded by a second client device to a remote computing system and the data includes a first value encrypted based on a certificate of the second client device, to determine validity of the certificate of the second client device based on another certificate of the remote computing system, to decrypt the first value with use of a key of the certificate of the second client device in response to validation of the certificate, to determine a second value for the received file, and to determine validity of the received file based on a match of the first value and the second value.

(CRM11) At least one non-transitory computer-readable medium may be configured as described in paragraph (CRM10), and at least one other non-transitory computer-readable medium may be encoded with instruction which, when executed by at least one other processor of the second client device, cause the second client device to receive a request to upload the file to the remote computing system, to generate a hash value based on contents of the file to be uploaded, to encrypt the hash value using a private key of the second client device in response to the request to upload the file, and to send, to the remote computing system, the encrypted hash value and the file to be uploaded.

(CRM12) At least one non-transitory computer-readable medium may be configured as described in paragraph (CRM11), and at least one other non-transitory computer-readable medium may be encoded with instruction which, when executed by at least one other processor of the remote computing system, cause the remote computing system to receive the file to be uploaded and the encrypted hash value, to generate a second hash value based on contents of the received file, to decrypt the encrypted hash value using a public key of the second client device to determine a decrypted hash value, to determine validity of the received file based on a match of the second hash value and the encrypted hash value, to generate the data to include at least the encrypted hash value based at least in part on the second hash value matching the decrypted hash value, and to store the received file and the data so that the file is available for download by at least the first client device.

(CRM13) At least one non-transitory computer-readable medium may be configured as described in any of paragraphs (CRM10) through (CRM12), and at least one other non-transitory computer-readable medium may be encoded with instruction which, when executed by at least one other processor of the remote computing system, cause the remote computing system to receive a request to register for file sharing using the remote computing system, and in response to the request to register for file sharing, to initiate a certificate authorization process with a CA for the remote computing system at least in part by causing the second client device to generate a key pair including a private key and a public key for the second client device, to generate a certificate including the public key and information identifying the second client device, to send the certificate to the CA for signature, and to receive a signed certificate from the CA, the signed certificate indicative of the private key being authorized to encrypt data sent by the second client device to the remote computing system.

(CRM14) At least one non-transitory computer-readable medium may be configured as described in any of paragraphs (CRM10) through (CRM13), wherein the data may further include an identifier associated with the second client device, and the at least first computer-readable medium may be encoded with additional instruction which, when executed by the at least first processor, further cause the first client device to determine, using the identifier, that the key of the certificate of the second client device is available at the first client device, and to use the available key to decrypt the first value.

(CRM15) At least one non-transitory computer-readable medium may be configured as described in any of paragraphs (CRM10) through (CRM14), wherein the data may further include an identifier for the second client device, and the at least first computer-readable medium may be encoded with additional instruction which, when executed by the at least first processor, further cause the first client device to determine, using the identifier, that the key of the certificate of the second client device is not available at the first client device, to send, to the remote computing system, a request for the key of the certificate of the second client device, and to use the received key to decrypt the first value.

(CRM16) At least one non-transitory computer-readable medium may be configured as described in any of paragraphs (CRM10) through (CRM15), and may be encoded with additional instruction which, when executed by the at least one processor, further cause the first client device to receive input data representing a request to download the file, wherein the file and the data may be received in response to receiving the input data.

(CRM17) At least one non-transitory computer-readable medium may be configured as described in any of paragraphs (CRM10) through (CRM16), and may be encoded with additional instruction which, when executed by the at least one processor, further cause the first client device to determine that the first client device is to automatically download the file after upload of the file to the remote computing system, wherein the file and the data may be received in response to detecting that the file has been uploaded to the remote computing system.

(CRM18) At least one non-transitory computer-readable medium may be encoded with instructions which, when executed by at least one processor of a computing system, cause the computing system to receive a file and a first value from a first client device, where the first value was encrypted based on contents of the file, to decrypt the first value with use of a key of a certificate of the first client device, to generate a second value for the file, to determine a match of the first value and the second value, and to generate data in response to the match of the first value and the second value, so as to enable download of the file by a second client device.

(CRM19) At least one non-transitory computer-readable medium may be configured as described in paragraph (CRM18), wherein the data may further include a certificate authority (CA) signature of a certificate of the computing system, and an identifier of the first client device.

(CRM20) At least one non-transitory computer-readable medium may be configured as described in paragraph (CRM18) or (CRM19), and may be encoded with additional instruction which, when executed by the at least one processor, further cause the computing system to receive from a second client device, a request to register for file sharing using the computing system, to receive, at a CA of the computing system, a certificate including a public key of the first client device and information identifying the first client device, to validate, by the CA and using the certificate, an identity of the first client device, to sign, by the CA, the certificate with a key of the CA, and to send, to the first client device, the signed certificate indicative of the first client device being authorized to encrypt data, using a private key corresponding to the public key of the first client device, sent to the computing system.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:
1. A method, comprising:
receiving, by a first client device, a file and data, the file having been previously uploaded by a second client device to a remote computing system and the data including a first hash value based on contents of the file previously uploaded by the second client device, the first hash value encrypted based on a document of the second client device;

determining, by the first client device, validity of the document of the second client device based on another document of the remote computing system;

decrypting, by the first client device, the first hash value with use of a key of the document of the second client device in response to validation of the document of the second client device;

determining, by the first client device, a second hash value for the received file, the second hash value based on contents of the file received by the first client device;

determining, by the first client device, validity of the received file based on a match of the first hash value and the second hash value;

receiving, at the first client device, an additional file and additional data, the additional file having been previously uploaded by the second client device to the remote computing system and the additional data including a third hash value encrypted based on the document of the second client device;

decrypting, by the first client device, the third hash value with use of the key of the document of the second client device in response to validation of the document of the second client device;

determining, by the first client device, a fourth hash value for the received additional file;

determining, by the first client device, that the received additional file is invalid based on a mismatch of the third hash value and the fourth hash value; and denying access to the received additional file at the first client device.

2. The method of claim 1, wherein:
the data further includes a document of a certificate authority (CA) of the remote computing system, and
determining the validity of the document of the second client device includes determining that the document has been signed by the CA.

3. The method of claim 1, wherein the data further includes an identifier of the second client device, and the method further comprises:
determining, by the first client device and using the identifier, that the key of the document of the second client device is available at the first client device; and
using the available key to decrypt the first hash value.

4. The method of claim 1, wherein the data further includes an identifier of the second client device, and the method further comprises:
determining, by the first client device and using the identifier, that the key of the document of the second client device is not available at the first client device;
sending, from the first client device to the remote computing system, a request for the key of the document of the second client device;
receiving, by the first client device and from the remote computing system, the key of the document of the second client device; and
using the received key to decrypt the first hash value.

5. The method of claim 1, further comprising:
receiving, from the first client device, input data representing a request to download the file,
wherein receiving the file and the data is in response to receiving the input data.

6. The method of claim 1, further comprising:
determining that the first client device is to download the file in response to uploading of the file to the remote computing system,
wherein receiving the file and the data is in response to detecting that the file is uploaded to the remote computing system.

7. The method of claim 1, wherein the data further includes a document for the remote computing system and an identifier of the second client device.

8. A system, comprising:
a first client device;
a second client device; and
a remote computing system, wherein the remote computing system includes at least a first processor, and at least a first non-transitory computer-readable medium encoded with instruction which, when executed by the first processor, cause the remote computing system to:
receive a file to be uploaded and a first hash value based on contents of the file and encrypted based on a document of the second client device;
generate a second hash value based on contents of the received file; decrypt the first hash value using a public key of the second client device to determine a decrypted hash value,
determine validity of the received file based on a match of the second hash value and the decrypted hash value;
based at least in part on the second hash value matching the decrypted hash value, generate data to include at least the first hash value; and
store the received file and the data so that the file is available for download by at least the first client device;
wherein the first client device includes at least a second processor, and at least a second computer-readable medium encoded with instruction which, when executed by the second processor, cause the first client device to:
receive the file and the data, the file having been previously uploaded by the second client device to the remote computing system and the data including the first hash value;
determine validity of the document of the second client device based on another document of the remote computing system;
decrypt the first hash value with use of public key of the document of the second client device in response to validation of the document;
determine a third hash value for the received file, the third hash value based on contents of the file received by the first client device; and
determine validity of the received file based on a match of the first hash value and the third hash value.

9. The system of claim 8, wherein the second client device includes at least a third processor, and at least a third computer-readable medium encoded with instruction which, when executed by the third processor, cause the second client device to:
receive a request to upload the file to the remote computing system;
in response to the request to upload the file, generate the first hash value based on contents of the file to be uploaded, the first hash value encrypted using a private key of the second client device; and
send, to the remote computing system, the first hash value and the file to be uploaded.

10. The system of claim 8, wherein the second client device includes at least a third processor, and at least a third computer-readable medium encoded with instruction which, when executed by the third processor, cause the second client device to:

receive a request to register for file sharing using the remote computing system; and in response to the request to register for file sharing, initiate a document authorization process with a certificate authority (CA) for the remote computing system by causing the second client device to:

generate a key pair including a private key and the public key for the second client device, generate a document including the public key and information identifying the second client device, send the document to the CA for signature, and receive a signed document from the CA, the signed document indicative of the private key being authorized to encrypt data sent by the second client device to the remote computing system.

11. The system of claim 8, wherein the data further includes an identifier associated with the second client device, and the second computer-readable medium is further encoded with additional instructions which, when executed by the second processor, further cause the first client device to:

determine, using the identifier, that the public key of the document of the second client device is available at the first client device; and use the available public key to decrypt the first hash value.

12. The system of claim 8, wherein the data further includes an identifier for the second client device, and the second computer-readable medium is further encoded with additional instructions which, when executed by the second processor, further cause the first client device to:

determine, using the identifier, that the public key of the document of the second client device is not available at the first client device;

send, to the remote computing system, a request for the public key of the document of the second client device; and use the received public key to decrypt the first hash value.

13. The system of claim 8, wherein the first second computer-readable medium is further encoded with additional instructions which, when executed by the second processor, further cause the first client device to:

receive input data representing a request to download the file, wherein the file and the data are received in response to receiving the input data.

14. The system of claim 8, wherein the second computer-readable medium is further encoded with additional instructions which, when executed by the second processor, further cause the first client device to:

determine that the first client device is to automatically download the file after upload of the file to the remote computing system, wherein the file and the data are received in response to detecting that the file is uploaded to the remote computing system.

15. A method, comprising:

receiving, at a computing system and from a first client device, a request to register for file sharing using the computing system;

receiving, at a certificate authority (CA) of the computing system, a document including a public key of the first client device and information identifying the first client device;

validating, by the CA and using the document, an identity of the first client device;

signing, by the CA, the document with a key of the CA;

sending, to the first client device, the signed document indicative of the first client device being authorized to encrypt data, using a private key corresponding to the public key of the first client device, sent to the computing system;

receiving, by the computing system, a file and a first value from the first client device, the first value being encrypted based on contents of the file;

decrypting, by the computing system, the first value with use of the public key of the document of the first client device;

generating, by the computing system, a second value for the file;

determining, by the computing system, a match of the first value and the second value; and generating, by the computing system, data in response to the match of the first value and the second value, so as to enable download of the file by a second client device.

16. The method of claim 15, wherein the data further includes a CA signature of a document of the computing system, and an identifier of the first client device.

* * * * *